US011928150B1

(12) United States Patent
Angel et al.

(10) Patent No.: US 11,928,150 B1
(45) Date of Patent: Mar. 12, 2024

(54) IMAGE-BASED ITEM IDENTIFICATION

(71) Applicant: Amazon Technologies, Inc., Seattle, WA (US)

(72) Inventors: Justin-Josef Angel, San Francisco, CA (US); Milena Sadee, San Francisco, CA (US); Cressida Magdalen Harding, Cambridge (GB); Eric Alan Breitbard, Oakland, CA (US); Animesh Mishra, Cambridge (GB); Vlastimil Pis, Cambridge (GB); Robert Steven Murdock, Fairfax, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/698,869

(22) Filed: Mar. 18, 2022

Related U.S. Application Data

(63) Continuation of application No. 16/746,472, filed on Jan. 17, 2020, now Pat. No. 11,281,713, which is a continuation of application No. 15/670,225, filed on Aug. 7, 2017, now Pat. No. 10,540,390.

(51) Int. Cl.
| | |
|---|---|
| *G06V 10/94* | (2022.01) |
| *G06F 16/432* | (2019.01) |
| *G06F 16/583* | (2019.01) |
| *G06V 10/40* | (2022.01) |
| *G06V 10/75* | (2022.01) |

(52) U.S. Cl.
CPC ........ *G06F 16/5838* (2019.01); *G06F 16/434* (2019.01); *G06F 16/5854* (2019.01); *G06V 10/40* (2022.01); *G06V 10/751* (2022.01); *G06V 10/95* (2022.01)

(58) Field of Classification Search
CPC .... G06F 16/434; G06F 16/532; G06F 16/583; G06F 16/5838; G06F 16/5854; G06F 18/254; G06V 10/809; G06V 10/95
See application file for complete search history.

(56) References Cited

U.S. PATENT DOCUMENTS

| | | | |
|---|---|---|---|
| 7,505,621 B1 | 3/2009 | Agrawal et al. | |
| 7,660,468 B2* | 2/2010 | Gokturk | G06F 16/5862 382/209 |
| 8,639,036 B1 | 1/2014 | Singer et al. | |
| 8,690,578 B1 | 4/2014 | Nusbaum et al. | |
| (Continued) | | | |

OTHER PUBLICATIONS

Office Action for U.S. Appl. No. 15/636,531, dated Feb. 22, 2021, Angel, "Item Recognition and Analysis", 19 Pages.

(Continued)

*Primary Examiner* — Ian L Lemieux
(74) *Attorney, Agent, or Firm* — Lee & Hayes, P.C.

(57) ABSTRACT

Systems and methods for image-based item identification are disclosed. Image data corresponding to one or more images depicting an item may be sent to one or more remote systems for image-based item identification. The identification indications and/or identification confidence scores received from the remote systems may be aggregated and weighted based at least in part on one or more factors related to the remote systems, the results, domains, image capture timing, image capture angles, and/or events to more accurately identify an item depicted in the images.

20 Claims, 9 Drawing Sheets

(56) References Cited

U.S. PATENT DOCUMENTS

| | | | |
|---|---|---|---|
| 8,732,025 B2* | 5/2014 | Gokturk | G06Q 30/0623 705/26.1 |
| 8,984,136 B1 | 3/2015 | Francis, Jr. et al. | |
| 8,990,213 B1 | 3/2015 | Yalamanchi et al. | |
| 9,160,993 B1 | 10/2015 | Lish et al. | |
| 9,171,230 B2* | 10/2015 | Jiang | G06V 10/764 |
| 9,569,700 B1 | 2/2017 | Santos et al. | |
| 9,702,858 B1 | 7/2017 | Minvielle | |
| 9,760,778 B1 | 9/2017 | Wakim | |
| 10,025,984 B2 | 7/2018 | Rajkumar et al. | |
| 10,091,972 B1 | 10/2018 | Jensen et al. | |
| 10,140,315 B1 | 11/2018 | Hohwald et al. | |
| 10,282,462 B2 | 5/2019 | Magnani et al. | |
| 10,438,277 B1 | 10/2019 | Jiang et al. | |
| 10,474,949 B2 | 11/2019 | Majumdar et al. | |
| 10,706,334 B2* | 7/2020 | Pan | G06F 18/253 |
| 10,902,263 B1 | 1/2021 | Angel et al. | |
| 10,963,657 B2 | 3/2021 | Rodriguez et al. | |
| 10,963,659 B1 | 3/2021 | Ahmed et al. | |
| 2006/0120609 A1 | 6/2006 | Ivanov et al. | |
| 2007/0086627 A1 | 4/2007 | Kim | |
| 2009/0176526 A1 | 7/2009 | Altman | |
| 2010/0103241 A1 | 4/2010 | Linaker | |
| 2010/0241596 A1 | 9/2010 | Lee et al. | |
| 2010/0250535 A1 | 9/2010 | Loftus et al. | |
| 2011/0098056 A1 | 4/2011 | Rhoads et al. | |
| 2012/0055718 A1 | 3/2012 | Chen | |
| 2012/0179665 A1 | 7/2012 | Baarman et al. | |
| 2013/0083064 A1 | 4/2013 | Geisner et al. | |
| 2013/0114849 A1 | 5/2013 | Pengelly et al. | |
| 2014/0102957 A1 | 4/2014 | Broeker et al. | |
| 2014/0172313 A1 | 6/2014 | Rayner | |
| 2014/0254865 A1 | 9/2014 | Soubra | |
| 2014/0307923 A1 | 10/2014 | Johansson | |
| 2014/0315162 A1 | 10/2014 | Ehrenkranz | |
| 2014/0364971 A1 | 12/2014 | Minvielle | |
| 2015/0036881 A1 | 2/2015 | Sharma et al. | |
| 2015/0078613 A1 | 3/2015 | Forutanpour et al. | |
| 2015/0132722 A1 | 5/2015 | Menczel et al. | |
| 2015/0260699 A1 | 9/2015 | Minvielle | |
| 2016/0012748 A1 | 1/2016 | Donavon | |
| 2016/0086029 A1 | 3/2016 | Dubuque | |
| 2016/0110793 A1 | 4/2016 | Herring et al. | |
| 2016/0148536 A1 | 5/2016 | Ashby | |
| 2016/0252390 A1 | 9/2016 | Batsikouras | |
| 2016/0270574 A1 | 9/2016 | Dekar | |
| 2016/0314380 A1 | 10/2016 | Abdulkader et al. | |
| 2017/0046596 A1 | 2/2017 | Bobbitt et al. | |
| 2017/0046980 A1 | 2/2017 | Mehta et al. | |
| 2017/0124912 A1 | 5/2017 | Ashby et al. | |
| 2017/0221296 A1 | 8/2017 | Jain et al. | |
| 2017/0249491 A1 | 8/2017 | MacIntosh et al. | |
| 2018/0011876 A1 | 1/2018 | Li et al. | |
| 2018/0063900 A1 | 3/2018 | Minvielle et al. | |
| 2018/0149519 A1 | 5/2018 | Connor | |
| 2018/0232602 A1 | 8/2018 | Dey et al. | |
| 2018/0232689 A1 | 8/2018 | Minvielle et al. | |
| 2018/0233064 A1 | 8/2018 | Dunn et al. | |
| 2018/0330238 A1 | 11/2018 | Luciw et al. | |
| 2018/0338354 A1 | 11/2018 | Bassill et al. | |
| 2019/0050657 A1 | 2/2019 | Gleeson-May et al. | |
| 2019/0114333 A1 | 4/2019 | Benboubakeur et al. | |
| 2020/0034634 A1 | 1/2020 | Warshauer-Baker et al. | |

OTHER PUBLICATIONS

Office Action for U.S. Appl. No. 15/636,531, dated Apr. 21, 2020, Angel, "Item Recognition and Analysis", 21 Pages.

Office Action For U.S. Appl. No. 16/746,472, dated May 5, 2021, Angel, "Image-Based Item Identification", 31 pages.

Final Office Action dated Nov. 1, 2019 for U.S. Appl. No. 15/636,531 "Item Recognition and Analysis", Angel, 20 pages.

Office action for U.S. Appl. No. 15/670,225, dated Mar. 11, 2019, Angel, "Image-Based Item Identification", 31 pages.

Office Action for U.S. Appl. No. 15/636,531, dated Jun. 12, 2019, Angel, "Item Recognition and Analysis", 18 pages.

Office Action for U.S. Appl. No. 16/746,472, dated Sep. 27, 2021, Angel, "Image-Based Item Identification", 13 pages.

* cited by examiner

IMAGE-BASED ITEM IDENTIFICATION

RELATED APPLICATIONS

This application claims priority to and is a continuation of U.S. patent application Ser. No. 16/746,472, filed on Jan. 17, 2020, which will issue as U.S. Pat. No. 11,281,713 on Mar. 22, 2022, which claims priority to and is a continuation of U.S. patent application Ser. No. 15/670,225, filed on Aug. 7, 2017, now known as U.S. Pat. No. 10,540,390, which issued on Jan. 21, 2020, the entire contents of which are incorporated herein by reference.

BACKGROUND

Identification of objects depicted in images can be an important operations in many fields, including, for example, the food industry, the automotive industry, and robots. Described herein are improvements in technology that will help, among other things, identify objects depicted in images more accurately.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
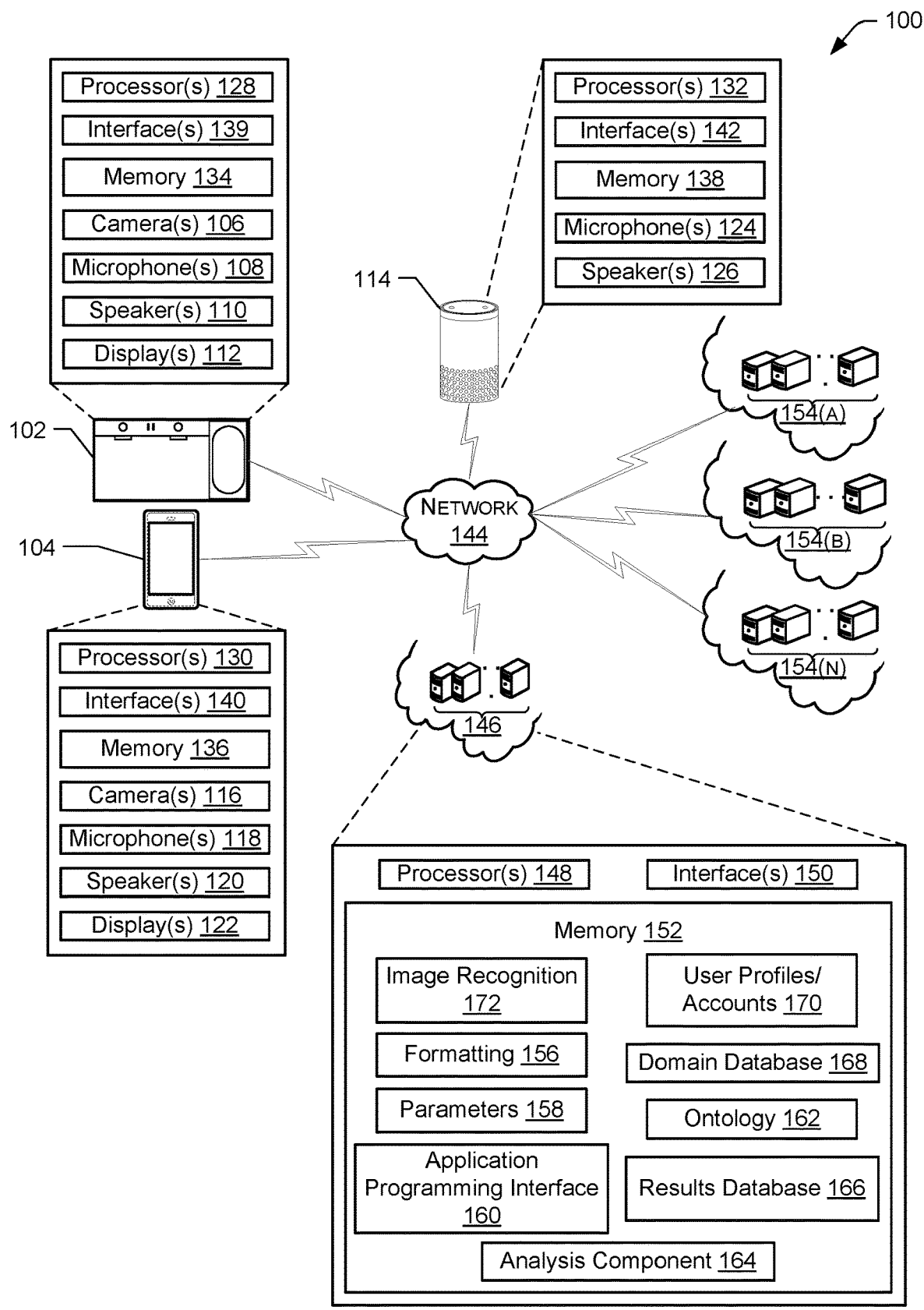
FIG. 1 illustrates a conceptual diagram of components of an image processing system for item identification.

Systems and methods for image-based item identification are described herein. Take, for example, an item placed in an environment that includes one or more cameras. The one or more cameras may capture one or more images of the environment, which may include an item disposed therein. Image data corresponding to the one or more images may be processed and sent to one or more remote systems for image-based item identification. In some examples, the remote systems, or a portion thereof, may be dedicated to receiving image data, processing that image data, and providing an identification indication of one or more items depicted in the image corresponding to the image data. The remote systems may be maintained by different entities, and as such, may utilize the same or different techniques to indicate the identity of items in images that those systems process. The identification indication, along with, in some instances, an indication of the confidence associated with the identification indication may be sent back to the computing system associated with the cameras and/or one or more computing systems and/or applications that are not associated with the cameras. The identification indication as well as the confidence scores may be aggregated and weighted by the computing system to provide a more accurate indication of the item(s) depicted in the captured images.

To illustrate, an example environment may have two cameras disposed therein, and an item, say an apple, may be placed within the environment. The two cameras may be disposed at different angles of view relative to the apple, may capture multiple images of the apple over time, may generate image data corresponding to the multiple images. As will be discussed in more detail below, preprocessing of the image data may include selecting and/or formatting image data corresponding to an image or set of images from each camera to be sent to the remote systems. The selected image data may include metadata that associates the image data with an image capture time and/or with the camera from which the corresponding image was captured. For the sake of illustration, say that two images, also described herein as frames, were selected from the images captured by a first camera, and two images were selected from the images captured by a second camera. The image data corresponding to these four images may be sent to one or more remote systems for image-based item identification. Again, for the sake of illustration, say that the image data is sent to three remote systems for image-based item identification.

Results from the three remote systems may be received and may provide an identification indication of the item(s) depicted in the images and in some instances an indication of a confidence associated with the indication. The identification indication may be a word or phrase, such as "apple," while the confidence may be, for example, a 95% confidence that the item is an apple. Once this data is received from the remote systems, one or more biases may be applied to the data to more accurately identify the item(s) depicted in the images. These biases may include, for example, weighting the results from remote systems based on past performance of those remote systems. The biases may additionally, or alternatively, include weighting the results based on the indication of confidence received from the remote systems. The biases may additionally, or alternatively, include weighting the results based on past performance of the remote systems with respect to an item domain, or category of items, associated with the item(s) depicted in the images. The biases may additionally, or alternatively, include weighting the results based on the environment in which the cameras are disposed. The biases may additionally, or alternatively, include weighting the results based on similarities and/or differences in identification indications and/or confidence levels received from the remote systems over time. The biases may additionally, or alternatively, include weighting the results based on similarities and/or differences in identification indications and/or confidence levels received from the remote systems for images captured at different angles with respect to item(s) depicted in the images. The biases may additionally, or alternatively, include weighting the results based on the detection of an event, such as the introduction of a new item within the environment and/or a determination that the item is moving. The biases may additionally, or alternatively, include weighting the results based on attributes of the captured images, such as brightness, lighting, sharpness, contrast, color, and/or tint, for example.

The biases may be applied to the data received from the remote systems to provide a more accurate indication of the identity of item(s) depicted in the images. Data indicating the identity of the item(s) and/or a confidence score associated with the identification indication may be stored and/or utilized to adjust the biases in subsequent image-based item identification operations. The data indicating the identity of the item(s) and/or a confidence associated with the identification indication may be received, for example, from the remote systems. The indicated identity of the item(s) may also be utilized to perform additional operations, such as, for example, determining a food item placed on a scale for nutritional information generation, determining that a pedestrian is in close proximity to an autonomous vehicle, and/or determining which item a robot is to focus on. These examples are for purposes of illustration and it should be understood that the application of improved image-based item identification as described herein may be utilized in a number of applications.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for image-based item identification. System 100 may include one or more devices, such as a first device 102 and/or a second device 104, with one or more cameras for capturing images of an environment containing an item. For example, the first device 102 may be an application-specific device that, in addition to capturing images via one or more cameras 106, may also perform operations specific to a given application. For example, the first device 102 may be a cutting board or other kitchen-related device used in the preparation of food items. The one or more cameras 106 of the first device 102 may be utilized for capturing images for image-based item identification, while other components of the first device 102 may be utilized for purposes related to the item identification or the specific application of the first device 102. For example, the first device 102 may include one or more microphones 108 utilized for capturing audio, such as user speech, and generating audio data. The audio data may be used, for example, to aid in the identification of a food item placed on the first device 102, to provide a command to the first device 102 such as retrieving, modifying, and/or generating a recipe associated with the food item, generating a food label associated with the food item, requesting nutritional information related to the food item to be determined, stored, obtained, and/or tracked, and other food-related tasks. The first device 102 may additionally include one or more speakers 110. The one or more speakers 110 may be utilized for outputting audio related, for example, to the item identification indication. The first device 102 may additionally, or alternatively, include one or more displays 112. The one or more displays 112 may be utilized for providing a visual presentation of the item identification indication and/or as a means for a user to provide input, such as via a touchscreen.

While the cameras 106, microphones 108, speakers 110, and displays 112 are shown in FIG. 1 to be components of a single device, these components may be separate from each other. For example, the one or more microphones 108 and/or the one or more speakers 110 may be components of a voice-assistant device 114 and/or the second device 104. Additionally, or alternatively, the one or more displays 112 may be components of a personal device, such as the second device 104. Thus, in some examples, the first device 102 may include the one or more cameras 106 and computing components described below. While the first device 102 is described herein as a cutting board by way of example, it should be understood that the first device 102 may be any application-specific device. By way of example, the first device 102 may be an appliance, a cooking utensil, a countertop or other surface, an autonomous vehicle, a robot, a security system, or other application-specific device.

The camera(s) 106 utilized to capture images may additionally, or alternatively, be components of a personal device, such as the second device 104. The second device 104 may not be specifically tailored for image-based item identification, but the components of the second device 104 may be utilized to facilitate image-based item identification. For example, the second device 104 may include at least one of (1) one or more cameras 116, (2) one or more microphones 118, (3) one or more speakers 120, and/or (4) one or more displays 112. Some or all of these components may perform the same or similar operations as the components described with respect to the first device 102. Additionally, or alternatively, the voice-assistant device 114 may include one or more microphones 124 and/or one or more speakers 126 that may perform the same or similar operations as the microphones 108 and/or the speakers 110 of the first device 102 and/or the microphones 118 and/or the speakers 120 of the second device 104.

The devices 102, 104, and/or 114 may also include one or more processors. As used herein, a processor, such as processor(s) 128, 130, and/or 132, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 128, 130, and/or 132 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 128, 130, and/or 132 may possess its own local memory, which also may store program components, program data, and/or one or more operating systems.

The device 102, 104, and/or 114 may also include memory 134, 136, and/or 138. Memory 134, 136, and/or 138 may include volatile and nonvolatile memory, removable and non-removable media implemented in any method or technology for storage of information, such as computer-readable instructions, data structures, program component, or other data. Such memory 134, 136, and/or 138 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 134, 136, and/or 138 may be implemented as computer-readable storage media ("CRSM"), which may be any available physical media accessible by the processor(s) 128, 130, and/or 132 to execute instructions stored on the memory 134, 136, and/or 138. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 134, 136, and/or 138, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Additionally, the device 102, 104, and/or 114 may include one or more network interface(s) 139, 140, and/or 142, which may enable communications between the components and/or devices shown in system 100 and/or with one or more remote systems, as well as other networked devices. Such network interface(s) 139, 140, and/or 142 can include one or more network interface controllers (NICs) or other types of transceiver devices to send and receive communications over a network 144.

For instance, each of the network interface(s) 139, 140, and/or 142 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 139, 140, and/or 142 may include a wide area network (WAN) component to enable communication over a wide area network.

The system 100 may also include a computing system 146. In some instances, the computing system 146 may be local to an environment associated the first device 102, the second device 104, and/or the voice-assistant device 114. For instance, the computing system 146 may be located within the first device 102, the second device 104, and/or the voice-assistant device 114. In some instances, some or all of the functionality of the computing system 146 may be performed by one or more of the first device 102, the second device 104, and/or the voice-assistant device 114.

The computing system 146 may include computing components such as, for example, one or more processors 148, one or more network interfaces 150, and/or memory 152. The processors 148, network interfaces 150, and memory 152 may include the same or similar components, and may have the same or similar functionality, as the processes 128, 130, and/or 132, the network interfaces 139, 140, and/or 142, and the memory 134, 136, and/or 138, respectively. The memory 152 may include computer-executable instructions, described below as components of the memory 152, that when executed by the one or more processors 148 may cause the one or more processors 148 to perform various operations. For example, the computing system 146 may be configured to receive image data representing an image depicting item(s) from one or more of the first device 102, the second device 104, and/or one or more cameras other than those of the first device 102 or the second device 104. The computing system 146 may be further configured to send instances of the image data to one or more remote systems, such as remote systems 154(*a*)-(*n*), where the remote systems 154(*a*)-(*n*) may be configured to indicate an identity of the items(s) depicted in the image. As used herein, the term "remote systems" may be used to describe network-based computing systems that are not physical components of, for example, the first device 102, the second device 104, the voice-assistant device 114, and/or the computing system 146, and/or "remote systems" may be used to describe network-based computing systems that are operated, owned by, controlled by, and/or development by a different person or entity than the first device 102, the second device 104, the voice-assistant device 114, and/or the computing system 146.

The image data may be sent to the remote systems 154(*a*)-(*n*) in the same or a different format from how the image data was received at the computing system 146. For example, a first remote system 154(*a*) may accept image data in a range of formats and as such may not require a specific format to process the image data. In other examples, a second remote system 154(*b*) may only accept and/or process image data that meets prescribed formatting requirements. The formatting requirements may include, for example, requiring monochromatic images, image size constraints, and/or image file type constraints. In instances where formatting of the image data is required by one or more of the remote systems 154(*a*)-(*n*) and/or when formatting of the image data is preferable, a formatting component 156 of the memory 152 may format the image data to comply with the requirements of the remote systems 154(*a*)-(*n*). The formatting component 156 may, for example, format the image data by resizing the image, converting the image data to a prescribed file type, and/or converting the image data to monochrome.

The image data may also be sent to the remote systems 154(*a*)-(*n*) with or without parameters associated with image processing. For example, one or more of the remote systems 154(*a*)-(*n*) may require that one or more parameters indicating how image processing is to occur be sent along with the image data. Additionally, the sending of one or more parameters indicating how image processing is to occur may provide the remote systems 154(*a*)-(*n*) with instructions, also described herein as a hint, as to how to process the image data. In these examples, a parameter generation component 158 of the memory 152 may generate one or more parameters to aid the remote systems 154(a)-(n) in the image-based item identification. For example, one or more parameters may be generated and sent indicating that the accompanying image data should be processed to indicate identification of item(s) depicted in the corresponding image(s). Additionally, or alternatively, one or more parameters may be generated and sent indicating a domain, or category of items, from which to identify the item(s), and/or an environment from which the image(s) were captured, and/or times at which the image(s) were captured, and/or angles at which the image(s) were captured, and/or event(s) that may have occurred with respect to the item(s). These parameters may be generated and sent in association with the image data to provide one more of the remote systems 154(a)-(n) with a hint as to what item(s) are depicted in the captured images.

The image data may be sent to the remote systems 154(a)-(n) via one or more application programming interfaces (APIs) 160. The APIs may be provided by the remote systems 154(a)-(n) as a means for accessing the functionality of the remote systems 154(a)-(n). For example, the APIs may be web-based APIs and may allow a developer associated with the computing system 146 to utilize the resources of the remote systems 154(a)-154(n) through one or more subroutines, protocols, and tools, for example. It should be understood that while API 160 is shown in FIG. 1 to be a component of the computing system 146, the API 160, or a portion thereof, may additionally or alternatively be a component of the remote systems 154(a)-(n) and/or another system or service. The image data and parameters may be sent to the remote systems 154(a)-(n) serially or in parallel. For example, image data corresponding to an image may be first sent to the first remote system 154(a) and then to the second remote system 154(b). In other examples, the image data may be sent to all or a subset of the remote systems 154(a)-(n) at the same time or substantially the same time to decrease latency in image-based item identification.

While the image data is described herein as being sent from the computing system 146, as described above, the computing system 146 may be a component of, for example, the first device 102, the second device 104, and/or the voice-assistant device 114. As such, the receipt of image data from the cameras and sending of image data to the remote systems 154(a)-(n) may be performed by one or more of the first device 102, the second device 104, the voice-assistant device 114, and/or the computing system 146. By way of example, the image data may be sent from the first device 102 and/or the second device 104 to the voice-assistant device 114, which may send the image data to the computing system 146. In other examples, the image data may be sent from the first device 102 and/or the second device 104 to the computing system 146.

The computing system 146 may additionally be configured to receive, from the remote systems 154(a)-(n), data representing identification indications of the item(s) depicted in the image(s). For example, the received data may include one or more words or phrases indicating the detected identity of an item depicted in the image(s). It should be understood that the phrase "identification indication," as used herein, is one of many phrases that could be used to describe the results provided by the remote systems 154(a)-(n). For example, the results received by the remote systems 154(a)-(n) may not be described as indications, but instead may be probable identifications, identification guesses, identification estimations, and so forth. Additionally, while the identification indications are described herein as word and/or phrases, the data received from the remote systems 154(a)-(n) may not specifically include a word or phrases, but instead may include data that, when interpreted by the computing system 146, may indicate identification indications as words or phrases.

The received data may additionally include an indication of the confidence level associated with the detected identity. Staying with the example above of an image depicting an apple, the indicated identity of the item may include words or phrases such as "apple," "food," "red," "fruit," "red apple," "Red Delicious apple," "juicy," "healthy," and/or "nutritious," for example. The confidence level may include, for example, a confidence percentage where 100% corresponds to the highest confidence while 0% corresponds to the lowest confidence. The confidence level may additionally, or alternatively, include different quantitative scales, such as 1-10 or 0-1, and/or qualitative scales such as red-yellow-green with red corresponding to low confidence, yellow corresponding to mid-level confidence, and green corresponding to high confidence. The confidence levels used herein are for illustration purposes only and it should be understood that the confidence level scales may be any quantitative and/or qualitative scale. Additionally, the confidence levels received from the remote systems 154(a)-(n) may differ amongst remote systems 154(a)-(n). In these examples, the computing system 146 may normalize or otherwise convert one or more of the received confidence levels such that the confidence levels may be more easily compared and utilized.

Additionally, the computing system 146 may store or access one or more ontologies 162 to correlate the identification indications received by the remote systems 154(a)-(n). The ontologies 162 may associate objects or instances with each other and with classes of objects and/or instances and may provide an indication of a relationship between objects and between objects and classes. For example, the word "food" may correspond to a class, to which a number of subclasses and objects are related. In this example, subclasses such as "fruit" and "vegetable," for example, may be present. The subclasses may have further subclasses, which may include words or phrases that relate to characteristics of the item(s), such as color, texture, brightness, etc. The ontologies 162 may be utilized by an analysis component 164 of the memory 152, described more fully below, to associate the identification indications of the remote systems 154(a)-(n) with each other and/or to associate naming conventions of the computer system 146 with naming conventions of the remote systems 154(a)-(n).

Additionally, or alternatively, the ontologies 162 may be utilized to infer item identification, such as when the identification indications provided by the remote systems 154(a)-(n) include only high-level, or class-level identifiers, and/or when only high-level identifiers are associated with a confidence score above a certain threshold. In these examples, while the remote systems 154(a)-(n) may not provide an object-level identification indication, such an object-level identification may be inferred from the class-level identifiers. Sticking with the apple example from above, a first remote system 154(a) may indicate that the depicted item is "fruit" and "red," while the second remote system 154(b) may indicate that the depicted item is "shiny" and "circular." While neither the first remote system 154(a) nor the second remote system 154(b) provided the object-level identification of "apple," the ontologies 162 may be utilized to identify the location of the identification indications of the remote systems 154(a)-(b) with respect to the ontologies 162 to determine one or more object-level items that correspond to the class-level identifiers that were provided. For example, the analysis component 164 may utilize the ontologies 162 and the data provided by the remote systems 154(a)-(b) to determine that the object-level item of an "apple" is associated with the class-level identifiers of "fruit," "red," "shiny," and "circular."

The computing system 146 may be further configured to analyze the data received from the remote systems 154(a)-(n). The analysis may include, for example, weighting first data received from the first remote system 154(a) and second data received from the second remote system 154(b). Weighting the data may be based on one or more factors. For example, weighting the data may be based at least in part on biases associated with the remote systems 154(a)-(n). By way of example, a first weighting value may be applied to results from the first remote system 154(a) and/or a second weighting value may be applied to results from the second remote system 154(b). The weighting values may be based at least in part on previous identification of items by the remote systems 154(a)-(b). For example, the weighting value may be based at least in part on a percentage of accurate previous item identifications by one of the remote systems 154(a)-(b).

By way of example, previous identification of items may indicate that the first remote system 154(a) provides more accurate identification indications than the second remote system 154(b), and/or the first remote system 154(a) provides identification indications with higher confidence scores than the second remote system 154(b). These weighting values may be utilized to weight the results from the first and second remote systems 154(a)-(b) such that, in this example, the results from the first remote system 154(a) are given more value or weighted more heavily that the results from the second remote system 154(b). The weighting values described herein may be, for example, coefficients associated with a confidence that the identity of a depicted item matches the identification indication provided by the remote systems 154(a)-(n). The weighting values described herein may be initially set to a default or core bias and may be adjusted and/or updated based at least in part on the accuracy of identification indications over time. Previous identification indications may be stored, for example, in a results database 166, which may be utilized to adjust and/or update the weighting values over time.

Determining the weighted data may additionally, or alternatively, be based at least in part on a domain associated with the depicted item and/or the device used to capture the image(s) depicting the item. A domain database 168 may store and/or access one or more domains, which may include indications of objects that are associated with each other based on one or more factors, such as an environment. The domain may correspond to a category of items to which the depicted item belongs. Domains may correlate to class-level and/or subclass-level identifiers from the ontologies 162. For example, if the depicted item is an "apple," a domain of "food" may be associated with the "apple." The domain associated with a depicted item may be based at least in part on the device from which the image data was received. For example, the device may be an application-specific device that is associated with capturing images related to a particular category of items. For example, an application-specific device of a cutting board or kitchen appliance may be associated with capturing images related to food. Determining that the device is an application-specific device may be based at least in part on an indication provided by the device and/or an analysis of previous results that indicate the most frequently-identified items are associated with a given domain. Additionally, or alternatively, the domain may be determined based at least in part on identification of the environment in which the device capturing the images is disposed. For example, when the device is disposed in a kitchen, the domain may be determined to be "food," while a device disposed at a baseball stadium may be associated with the domain of "sports." Determining that the device is disposed in a given environment may be based at least in part on an indication provided by the device and/or an analysis of previous results that indicate the environment. The domain may additionally, or alternatively, be determined based on a first set of results from the remote systems 154(a)-(n) and then the determined domain may be utilized to weight the results and/or to provide a domain parameter to the remote systems 154(a)-(n). For example, in instances where the domain is not known, first image data may be sent to one or more of the remote systems 154(a)-(n) and results may be received. The results may indicate that the item is associated with a particular domain. That information may be utilized to generate a domain parameter to be sent with the first image data, or second image data generated subsequent to determining the domain, to one or more of the remote systems 154(a)-(n) to aid in the identification of the item. Additionally, or alternatively, the determined domain may be utilized by the computing system 146 to weight the results from the remote systems 154(a)-(n) such that results associated with the determined domain are weighted more heavily than the results not associated with the determined domain.

Determining the weighted data based at least in part on the domain associated with the depicted item may include determining weighting values to apply to the results from the remote systems 154(a)-(n). For example, if the determined domain is "food" and the first remote system 154(a) provides an identification indication of "apple" while the second remote system 154(b) provides an identification indication of "baseball," the analysis component 164 may determine that the object-level identification of "apple" is associated with a class or subclass of "food" while the object-level identification of "baseball" has no associated class or subclass of "food." Based on this determination and the determined domain of "food," the results from the first remote system 154(a), which identified the item as "apple," may be weighted more heavily than the results of the second remote system 154(b). Additionally, or alternatively, a core bias or learned bias of the first remote system 154(a) may be that it historically or categorically provides accurate results when identifying items in the "food" domain, while the second remote system 154(b) is not associated with such a bias or is associated with a bias that indicates the second remote system 154(b) historically or categorically does not provide accurate results when identifying items in the food domain. Based on these biases, the results from the remote systems 154(a)-(b) may be weighted accordingly.

Determining the weighted data may additionally, or alternatively, be based at least in part on a time parameter associated with the image data. For example, multiple images depicting an item may be captured over time. The image data corresponding to the multiple images may be sent to the remote systems 154(a)-(n) and multiple identification indications may be received from the remote systems 154(a)-(n). In some examples, the identification indications from one of the remote systems 154(a) may be relatively consistent, indicating the identity of the item to be the same or similar over time, while the identification indications from another of the remote systems 154(b) may be relatively and/or comparatively inconsistent, indicating different identities over time and/or indicating the identity of the item with fluctuating confidences. In these examples, the results from the first remote system 154(a) with more consistent results over time may be weighted more heavily than the results from the second remote system 154(b) with less consistent results over time. It should be understood that the timing described herein may be a matter of seconds, fractions of seconds, minutes, hours, and so forth.

Determining the weighted data may additionally, or alternatively, be based at least in part on an angle parameter associated with the image data. For example, images may be captured from different angles relative to the depicted item. The images may be captured from different angles using the same camera that moves proximate to the item and/or by multiple cameras, which may be moving or stationary, disposed proximate to the item. The image data corresponding to the multiple angles may be sent to the remote systems 154(a)-(n) and multiple identification indications may be received from the remote systems 154(a)-(n). In some examples, identification indications related to images captured from one angle may be relatively consistent, indicating the identity of the item to be the same or similar items and/or indicating the identity of the item with consistently high confidence scores, while the identification indications related to images captured from another angle may be relatively inconsistent, indicating different identities and/or indicating the identity of the item with fluctuating confidences. In these examples, the results associated with images captured from the angle with consistent results may be weighted more heavily than the results associated with images captured from the angle with less consistent results.

Determining the weighted data may additionally, or alternatively, be based at least in part on determining that an event has occurred with respect to the environment in which the item is disposed. By way of example, the event may be the introduction or removal of an item from the view of one or more cameras capturing images of the environment. In other examples, the event may be the change of position of an item within the environment. In examples where the event includes the introduction of a new item to the environment, the image data corresponding to images depicting both items may be processed by the remote systems 154(a)-(n). In these examples, the remote systems 154(a)-(n) may process the image data and provide identification indications that include the identities of both items. Some remote systems 154(a)-(n) may provide multiple item identifications more accurately than other remote systems 154(a)-(n), which may be utilized to weight the more accurate remote systems 154(a)-(n) more heavily than the less accurate remote systems 154(a)-(n). Additionally, or alternatively, the addition of a new item may inform the determination of the domain associated with the items. For example, if two items are identified as fruits, the determination that the domain is associated with "food" may be made at a higher confidence than when only one fruit is detected. Additionally, or alternatively, a determination that the position of an item within the environment has changed may inform the determination of the domain associated with the item. For example, a determination that the position of the item has changed may indicate that the item is alive or otherwise capable of moving. These characteristics of the item may be utilized to determine which results from the remote systems 154(a)-(n) are most relevant. For example, if the computing system 146 determines that the item is moving, the results from the first remote system 154(a) include "dog," and the results from the second remote system 154(b) include "toy," the computing system 146 may weight the results from the first remote system 154(a) more heavily than the results from the second remote system 154(b) because "dog" may be associated with the characteristic of "alive" or "animate" while "toy" may not be associated with characteristics indicative of motion.

Determining the weighted data may additionally, or alternatively, be based at least in part on data stored in a user profile and/or user account database 170. The user profile and/or user account database 170 may include information related to one or more user profiles and/or accounts. This information may include indications of items and activities that are associated with the profiles and/or accounts. For example, the user profiles and/or accounts may include information indicating that a user associated with the profile and/or account owns a dog, plays baseball, eats fruits frequently, is lactose intolerant, etc. This information can be utilized by the analysis component 164 to weight results received from the remote systems 154(a)-(n). For example, the first remote system 154(a) may return results indicating the identity of a depicted item to be "dog" while the second remote system 154(b) may return results indicating the identity of the detected item to be "cat." The analysis component 164 may access the user profile and/or account database 170 and utilize information stored therein to determine which result to weight more heavily. Sticking with this example, a user associated with the device capturing the image may have a corresponding user profile that indicates that the user owns a dog and/or does not own a cat. Based at least in part on this information, the analysis component 164 may weight the results from the first remote system 154(a), which identified the item as "dog," more heavily than the results from the second remote system 154(b).

The analysis component 164 of the computing system 146 may utilize one or more of the weighting values described herein to bias the results obtained from the remote systems 154(a)-(n). In doing so, results that are more likely to include an accurate identification indication of an item depicted in image(s) are favored over results that are less likely to include accurate identification indications. In addition to the data received from the remote systems 154(a)-(b) indicating identification indications, the computing system 146 may include its own identification indication functionality, described herein as an image recognition component 172.

The image recognition component 172 may include one or more components, such as an image data storage component. The image data storage may include a library of image data corresponding to items that have been previously identified. The image data stored in the library may be categorized based on item domains, such as, for example, a food domain, a sports domain, a household domain, etc. Within each item domain, image data corresponding to one or more items may be stored and designated. It should be understood that while the image data storage is described in this example as a component of the image recognition component 172 of the computing system 146, the image data storage may be a remote component that the computing system 146 may access, such as via the network 144.

Using the food domain as an example, image data corresponding to food items may be stored, and image data associated with a particular food item may be designated as corresponding to that food item. For example, image data corresponding to an image of a banana may be stored in the food domain of the image data storage and that image data may be designated as corresponding to a banana. Aspects of the image data, such as the color, shape, texture, shininess, brightness, contrast, etc. of the depicted item may be tagged or otherwise designated as corresponding to the item depicted in the image. The image data storage may be updated, such as when image data corresponding to an item that has not previously been designated as corresponding to that item is received. The designation may be made by a user, such as through a visual, audible, and/or tactile command, and/or the designation may be based on a comparison of the image data to external image data databases.

The image recognition component 172 may also include an image data analysis component. The image data analysis component may utilize the received image data in conjunction with image data stored in the image data storage to provide an indication of identification of the item depicted in the image. The image data analysis component may compare aspects of the received image data with aspects of the stored image data to determine which stored image data most likely corresponds to the received image data. For example, the analysis may reveal that the received image data is similar in one or more respects to stored image data corresponding to items such as a lime, a watermelon, a grape, or an apple. In this example, the image data analysis component may determine that a color of the item depicted in the received image data is a shade of green, for example, and a similar shade of green is associated with stored image data associated with a lime, a watermelon, a grape, and an apple. Each of the potentially matching stored image data may be assigned a confidence level, and the match with the highest confidence level may be determined to be the identified item. In instances where the confidence level of the identified item is below a threshold confidence level, say, for example, 90% confidence, the item may be identified as one of multiple potential items and user input and/or analysis of additional data associated with the item, such as a recipe, may be utilized to assist in identifying the item.

The one or more remote systems 154(a)-(n) may utilize the same or different image analysis techniques as described with respect to the image recognition component 172 to process the image data and provide identification indications. The results from the image recognition component 172 may be weighted in a similar fashion to the results from the one or more remote systems 154(a)-(n) by the analysis component 164 to determine the most likely identity of item(s) depicted in image(s). While the components of memory 152 of the computing system 146 have been described herein as performing certain functions, it should be understood that some or all of the components of memory 152 may be components of the first device 102, the second device 104, the voice-assistant device 114, and/or one or more of the remote systems 154(a)-(n).

The computing system 146 may be configured to perform one or more additional functions, including for example, determining that a given remote system, such as remote system 154(a) frequently returns results with inaccurate identification indications and/or with identification indications that are below a threshold confidence level. Based at least in part on this determination, the computing system 146 may determine that the remote system 154(a) is unreliable, either in general or with respect to a given domain, and may refrain from sending subsequent image data to that remote system 154(a). Additionally, or alternatively, the subsequent image data may instead be sent to another remote system, such as remote system 154(b).

Figure 2:
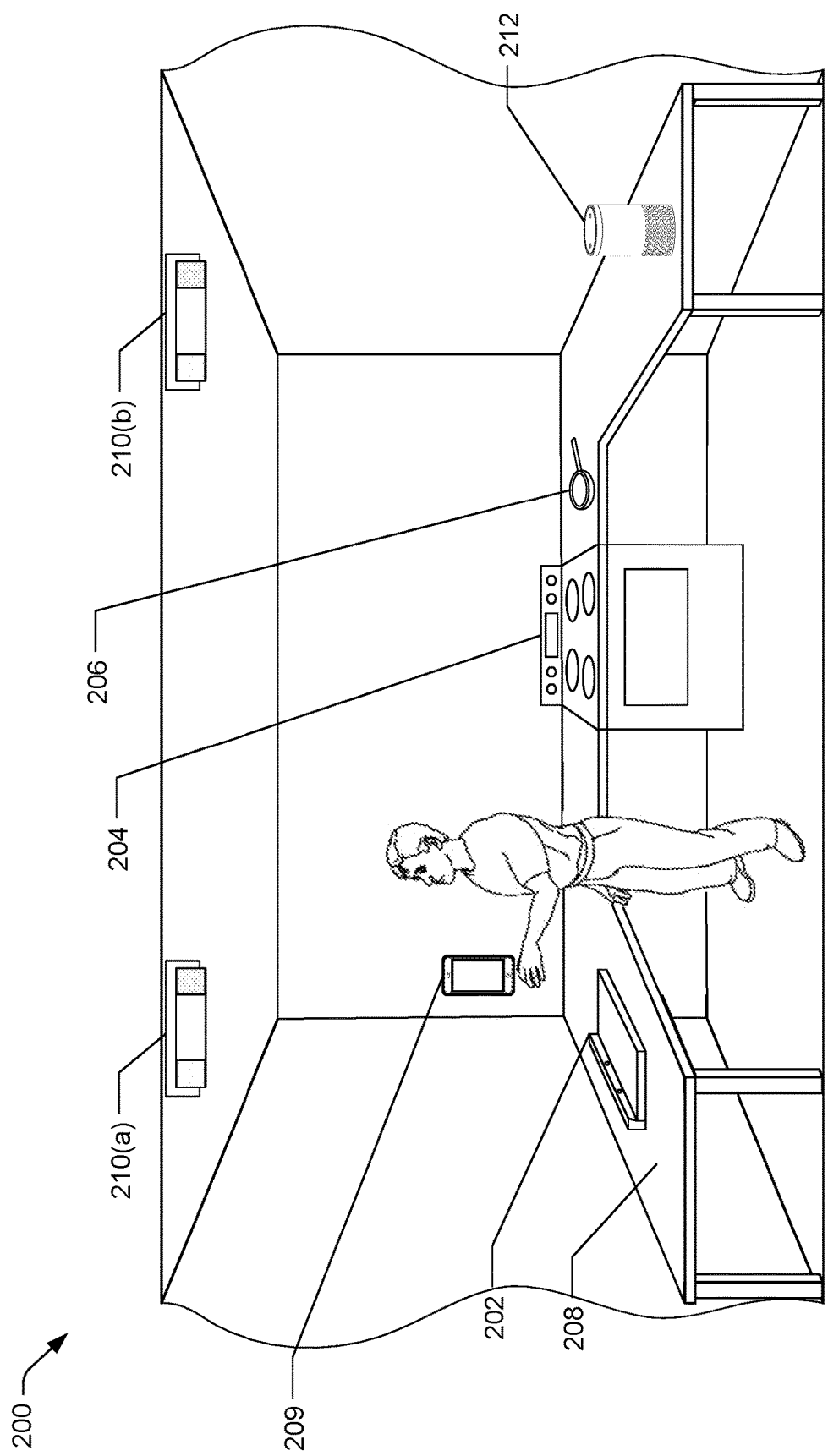
FIG. 2 illustrates a schematic diagram of an example environment for image-capturing devices.

FIG. 2 illustrates a schematic diagram of an example environment 200 for image-capturing devices. The environment 200 may include an application-specific device, such as a cutting board 202, a kitchen appliance 204, a kitchen utensil 206, and/or a countertop 208, which may be specifically configured to capture images for image-based item identification. The environment 200 may additionally, or alternatively, include a mobile device 209, which may not be specifically configured to capture images for image-based item identification but may be configured with a camera to capture images with and communication means to send image data corresponding to those images and receive results of image-based item identification from a remote device. In some examples, the device used to capture images for image-based item identification may be mounted in a room, such as, for example, a kitchen. For example, one or more cameras 210(a) and 210(b) may be mounted on a countertop, a wall, a cabinet, an appliance, a light, and/or a ceiling of the environment 200. Additionally, the environment 200 may include a voice-assistant device 212, which may receive audible user input to assist in image-based item identification and may output audio corresponding, for example, to the resulting identification of an item.

The environment 200 in which the image-capturing device is disposed may indicate a domain or set of domains from which items may be identified. As shown in FIG. 2, the environment 200 is a kitchen, which may be associated with the domain of "food," for example. Identification of this domain may be utilized to, for example, provide a domain parameter to systems performing image-based item identification and/or weight results received from such systems. While the environment 200 is illustrated in FIG. 2 as a kitchen, it should be understood that the devices for capturing images may be any environment. Additionally, the environment 200 may be static, such as when the image-capturing device is utilized only in a specific environment and/or when the image capturing device is affixed to an environment, or the environment 200 may be dynamic, such as when the image-capturing device is not application-specific and/or when the image-capturing device is mobile.

Figure 3:
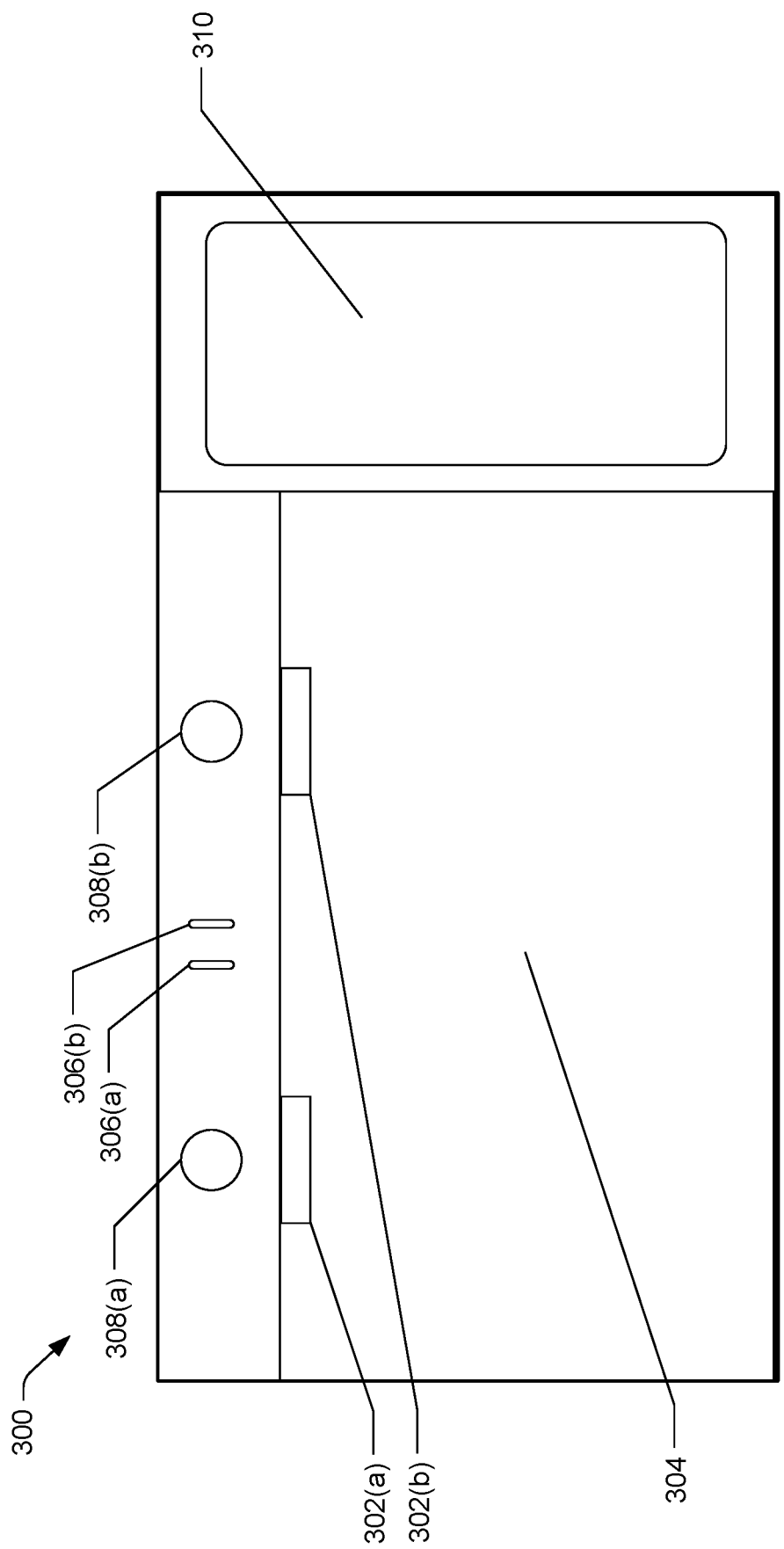
FIG. 3 illustrates a schematic diagram of an example device for capturing images for item identification.

FIG. 3 illustrates a schematic diagram of an example device 300 for item recognition and analysis. The device 300 may be similar to the cutting board 202 described with respect to FIG. 2, above. The device 300 is an example of an application-specific device, but it should be understood that devices that are not application specific may be used in the same or a similar manner as the device 300. For example, the device 300 may include one or more cameras 302(a) and 302(b). The cameras 302(a) and 302(b) may capture one or more images of an item placed on the device 300. By way of example, the cameras 302(a) and 302(b) may initiate the capturing of the one or more images based at least in part on a signal from the device 300. The signal may indicate that an item has been detected on the surface 304 of the device 300. Additionally, or alternatively, the cameras 302(a) and 302(b) may initiate capturing one or more images based at least in part on a user command received via one or more microphones 306(a) and 306(b) and/or an input received via a display 310, such as a touchscreen. The signal may additionally, or alternatively, be provided from one or more other devices, such as a voice-assistant device or a personal device, for example.

Both or just one of the cameras 302(a) and 302(b) may capture images. The number of images captured may vary based at least in part on the frames per second (fps) at which the cameras 302(a) and 302(b) operate or are configured to operate as well as the number of seconds during which the cameras 302(a) and 302(b) are configured to capture images. In examples, the cameras 302(a) and 302(b) may be set to an initial fps rate and an initial capture time. By way of example, the initial fps rate may be 30 fps and the capture time may be 5 seconds, which may generate a total of approximately 150 frames per camera. The fps rate and/or the capture time may be dynamic and may adjust based on data relating to previous use of the cameras 302(a) and 302(b) indicating a minimum fps and capture time that is likely to produce accurate item recognition above a threshold confidence level.

For example, an apple may be placed on the surface 304. In an instance where the fps rate is initially set at 30 fps and the capture time is initially set to 5 seconds, 150 frames per camera may be captured. During analysis of the image data corresponding to the 150 frames per camera, as discussed in more detail herein, a determination may be made that the item on the surface 304 is an apple at 99% confidence after analysis of the 150 frames per camera. Additionally, it may be determined that the item on the surface 304 is an apple at 95% confidence after analysis of 10 frames per camera. In this example, the apple is identified at a high confidence level after even 10 frames are analyzed. As such, the fps rate and/or the capture time may be adjusted such that image data corresponding to fewer frames is analyzed during item recognition. For example, the fps rate may be decreased to 5 fps and the capture time may be decreased to 2 seconds. Likewise, if the set fps and/or capture time provides a number of frames that do not lead to item identification to a high confidence level, the fps rate and/or the capture time may be increased.

The cameras 302(a) and 302(b) may capture one or more images as described herein and image data corresponding to the images may be generated. The image data may be stored locally on the device 300 and/or the image data may be transmitted to a remote system, such as another device associated with the environment of the user, and/or to a system remote from the environment of the user. The images captured by the cameras 302(a) and 302(b) may correspond to visible light reflected from a surface of the object on the surface 304. Additionally, or alternatively, the images captured by the cameras 302(a) and 302(b) may correspond to light outside the visible light spectrum, such as, for example, infrared light reflected from a surface or other portion of the object on the device 300. Furthermore, the cameras 302(a) and 302(b) may be disposed at locations that provide differing angles with respect to the item on the surface 304. Additionally, or alternatively, the cameras 302(a) and 302(b) may be stationary with respect to the surface 304 or the cameras 302(a) and 302(b) may move. For example, the cameras 302(a) and 302(b) may rotate about the surface 304, may move horizontally with respect to the surface 304, may move vertically with respect to the surface 304, and/or may move closer to and/or farther from the surface 304. Additionally, or alternatively, the cameras 302(a) and 302(b) may be configured to adjust zoom parameters, pan parameters, and/or tilt parameters. These parameters may be adjusted manually, such as by a user of the device 300, and/or via instructions provided to the cameras 302(a) and 302(b) from one or more processors. Additionally, the parameters may be adjusted via physical changes to the cameras 302(a) and 302(b) and/or digital changes to the image data generated by the cameras 302(a) and 302(b).

In the example shown in FIG. 3, two cameras 302(a) and 302(b) are shown. However, it should be appreciated that one camera may be used or more than two cameras may be used. For example, four cameras may be associated with the device 300. The four cameras may be situated to capture images that depict all or substantially all of the item placed on the surface 204. In examples where more than one camera is associated with the device 300, image data corresponding to an image from a first camera may be stitched together or otherwise associated with an image from the second camera to generate a full or partial three-dimensional model of the item on the surface 304. Additionally, or alternatively, the one or more cameras 302(a) and 302(b) may be components of the surface 304 and may be positioned to point outward from the surface 304. In these examples, the surface 304 may be transparent or substantially transparent to allow light reflected off the item to be captured by the one or more cameras 302(a) and 302(b).

Additionally, or alternatively, in instances where multiple cameras are utilized, all of the cameras may capture images of the item or only a portion of the multiple cameras may capture images of the item. In examples, one or a portion of the cameras may be utilized to capture images. If analysis of first image data corresponding to the images provides for identification of the item at a high confidence level, the remaining cameras may not be utilized. However, if the item is not identified or is identified at below a threshold confidence level, one or more of the remaining cameras may initiate capturing images of the item and second image data corresponding to the images may be analyzed separately or in conjunction with the first image data to identify the item. Additionally, or alternatively, use of a portion of the multiple cameras may be based at least in part on a determination of whether the item is occluded or partially occluded from view of one or more of the cameras. The cameras having an occluded view may not be utilized to capture images and/or such cameras may be moved to a position with an unoccluded or less occluded view. A preview or example image or video feed of the item being viewed by the cameras may be displayed, such as, for example, on display 310.

Also in the example shown in FIG. 3, the cameras 302(a) and 302(b) are depicted as components of the device 300. However, it should be appreciated that the cameras 302(a) and 302(b) may be separate components from the device 300 and may be situated elsewhere in the environment in which the device 300 is disposed. For example, one or more cameras may be mounted in a room, such as, for example, a kitchen. The one or more cameras may be mounted near the device 300, such as, for example, on a countertop, a wall, a cabinet, an appliance, a light, and/or a ceiling of the environment in which the device 300 is disposed.

The device 300 may additionally include one or more microphones 306(a) and 306(b). While two microphones are depicted with respect to FIG. 3, it should be appreciated that only one microphone may be provided or more than two microphones may be provided. The microphones 306(a) and 306(b) may be configured to receive audio representing sound from an environment in which the device 300 is disposed. The sound may include, for example, user speech and/or background noise. The sound may be captured by the microphones 306(a) and 306(b) and may be converted to audio data representing the sound. Automatic speech recognition may be performed on the audio data to generate text data corresponding to the user speech. Natural language understanding techniques may be performed on the text data to determine one or more intents associated with the user speech. By way of example, the intents corresponding to the user speech may be, for example, an intent to indicate that an item has been placed on the surface 304, a command to identify the item, a confirmation that the detected item is the item on the surface 304, a notification that the detected item is not the item on the surface 304, and/or other intents associated with identification of the item and/or intents associated with the use of information associated with the item.

The device 300 may additionally include one or more speakers 308(a) and 308(b). While two speakers are depicted with respect to FIG. 3, it should be appreciated that only one speaker may be provided or more than two speakers may be provided. The speakers 308(a) and 308(b) may be configured to receive audio data, such as, for example, from memory local to the device 300 and/or from a remote system. The speakers 308(a) and 308(b) may output audio corresponding to the received audio data. The audio may provide an audible notification or query to the user of the device 300. For example, the audible notification may be identification of the item on the surface 304, a prompt for the user to provide a confirmatory statement related to the detected item, and/or acknowledgement of user-provided information.

The device 300 may additionally include a display 310. The display 310 may be a fixed component of the device 300. In other examples, the display 310 may be removably coupled to the device 300, such as, for example, via a docking station. In examples, the display 310 may be provided along with the other components of the device 300. In other examples, the display 310 may be provided separate from the other components of the device 300 and/or may be provided by a third-party. The display 310 may be configured to present information related to identification of items placed on the surface 304. The display 310 may additionally, or alternatively, be configured to display information related to previously-detected items and supplement information related to such items. The display 310 may additionally, or alternatively, be configured to receive input. For example, the display 310 may be a touchscreen, which may accept touch input. In general, the components of FIG. 3 may be utilized, at least in part, to identify an item placed on the device 300.

Figure 4:
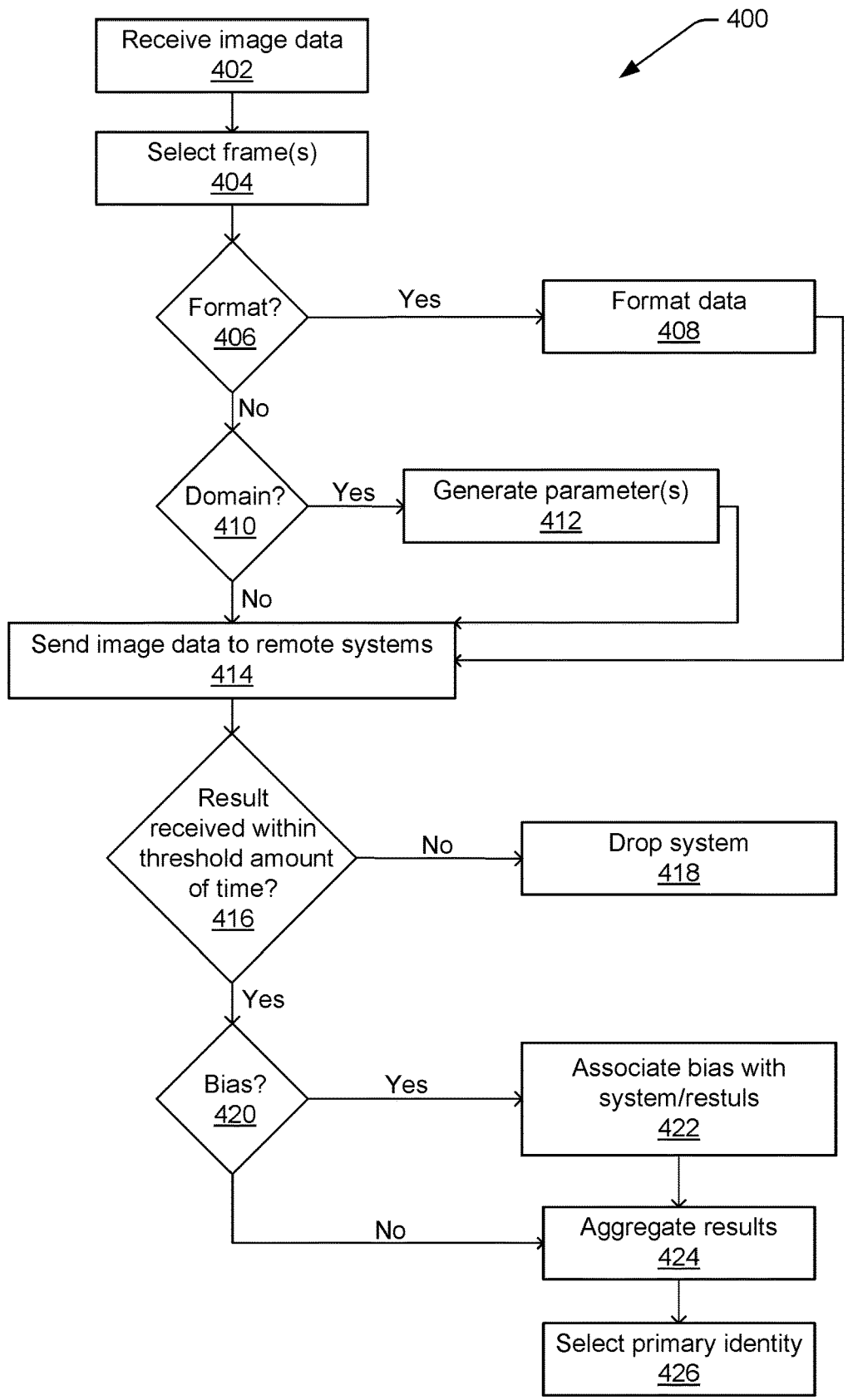
FIG. 4 illustrates a flow diagram of an example process for image-based item identification.

FIG. 4 illustrates a flow diagram of an example process 400 for image-based item identification. The order in which the operations or steps are described is not intended to be construed as a limitation, and any number of the described operations may be combined in any order and/or in parallel to implement process 400. At block 402, process 400 may include receiving image data. The image data may correspond to one or more images captured by one or more cameras from one or more angles with respect to an item depicted in the one or more images. The image data may be received over a network and via network interfaces as described herein.

At block 404, the process 400 may include selecting a frame or set of frames on which to perform image-based item identification. For example, if the received image data corresponds to 10 images, or frames, captured by a camera, analysis of the 10 images may be performed to select a representative image or set of images for image-based item identification. Analysis of the images may include, for example, a determination of the quality of the images as determined based at least in part on the brightness of the images, the contrast of the images, the sharpness of the images, the color of the images, and/or other characteristics associated with the images. In the example used throughout this process 400, it will be assumed that a single image is selected at block 404. However, it should be understood that any number of images may be selected. In other examples, such as when multiple cameras are utilized to capture images, an image or set of images may be selected from each of the cameras or a portion of the cameras. In still further examples, such as when images are captured at different angles with respect to the item depicted in the images, an image or set of images may be selected from each of the angles. In examples, image data corresponding to all received images may be selected. In other examples, images may be stitched together or otherwise combined to generate a partial or full three-dimensional model of the item, and image data corresponding to the model may be selected.

At block 406, the process 400 may include determining whether the image data is required to be, or could be, formatted. For example, an image-processing system, such as a remote system, may accept image data in a range of formats and as such may not require a specific format to process the image data. In other examples, the remote system may accept and/or process image data that meets prescribed formatting requirements. The formatting requirements may include, for example, requiring monochromatic images, image size constraints, and/or image file type constraints. In instances where formatting of the image data is required by a remote system, the image data may be formatted to comply with the requirements of the remote system. In some examples, while the remote system may not prescribe a certain format for image data, formatting the image data may be preferable. For example, formatting image data to be consistent across remote systems may provide uniformity when determining how to weight the results received by the remote systems, as described herein.

If, at block 406, image data formatting is required or preferable, then at block 408, the image data may be formatted by, for example, resizing the image, converting the image data to a prescribed file type, cropping, and/or converting the image data to monochrome. If, at block 406, image data formatting is not required and/or is not preferable, then at block 410, a determination may be made as to whether a domain, or category of items, associated with the item depicted in the image has been identified. For example, if the depicted item is an "apple," a domain of "food" may be associated with the "apple." The domain associated with a depicted item may be based at least in part on the device from which the image data was received. For example, the device may be an application-specific device that is associated with capturing images related to a particular category of items. For example, an application-specific device of a cutting board or kitchen appliance may be associated with capturing images related to food. Determining that the device is an application-specific device may be based at least in part on an indication provided by the device and/or an analysis of previous results that indicate the most frequently-identified items associated with a given domain. Additionally, or alternatively, the domain may be determined based at least in part on identification of the environment in which the device capturing the images is disposed. For example, when the device is disposed in a kitchen, the domain may be determined to be "food," while a device disposed at a baseball stadium may be associated with the domain of "sports." Determining that the device is disposed in a given environment may be based at least in part on an indication provided by the device and/or an analysis of previous results that indicate the environment.

If, at block 410, a domain is determined to be associated with the image data, then at block 412, one or more parameters may be generated related to the domain. For example, the one or more parameters may indicate the domain from which to identify the item. The parameters may additionally, or alternatively, include an indication of an environment from which the image was captured, and/or times at which the image was captured, and/or angles at which the image was captured, and/or events that may have occurred with respect to the item.

At block 414, the image data, having been formatted at block 408 if necessary or preferred, and the parameters generated by block 412, if any, may be sent to one or more remote systems for image-based item identification. Sending the image data and parameters, if any, to the remote systems may be performed based at least in part on one or more APIs provided by the remote systems and the image data and parameters may be sent over the networks and via the network interfaces described herein. Selection of the remote systems may be based at least in part on past image-based processing performance of the remote systems, characteristics associated with the remote systems, the domain associated with the image data, latency associated with the remote systems, and/or other performance-related considerations. Example remote systems include, without limitation, Amazon Web Services Rekognition, Microsoft Azure Computer Vision, Diffbot, Google Cloud Vision, IBM Watson Visual Recognition, CloudSight, and/or Clarifai. The image data and/or the parameters may be sent to some or all of these remote systems, or others, for image-based item identification.

At block 416, a determination may be made as to whether result data is received from the one or more remote systems within a threshold amount of time. For example, once image data is sent to the remote systems, a threshold amount of time to receive results from the remote systems may be set to prevent unnecessary or undesirable latency. The threshold amount of time may be, for example, a matter of seconds, fractions of seconds, minutes, hours, days, etc. and may depend on the domain and/or the application for the image-based item identification. If, at block 418, result data is not received from a given remote system within the threshold amount of time, the remote system may be dropped or otherwise ignored. A remote system that was not initially selected may be utilized instead, in examples.

If, at block 420, result data is received from the remote systems within the threshold amount of time, a determination may be made as to whether to associate a bias with one or more of the remote systems and/or with the result data received from one or more of the remote systems. The bias may include, for example, weighting the result data from one remote system more heavily or less heavily than another remote system and/or associating a weighting value with the remote systems and/or the results from the remote systems. For example, weighting the data may be based at least in part on biases associated with the remote systems. By way of example, a first weighting value may be applied to results from a first remote system and/or a second weighting value may be applied to results from a second remote system. The weighting value may be based at least in part on previous identification of items by the remote systems.

By way of example, previous identification of items may indicate that the first remote system provides more accurate identification indications than the second remote system, and/or the first remote system provides identification indications with higher confidence scores. These weighting values may be utilized to weight the results from the first and second remote systems such that, in this example, the results from the first remote system are given more value or weighted more heavily that the results from the second remote system. The weighting values described herein may be, for example, coefficients associated with a confidence that the identity of depicted item matches the identification indication provided by the remote systems. The weighting values described herein may be initially set to a default or core bias and may be adjusted based at least in part on the accuracy of identification indications over time.

The biases may additionally, or alternatively, be based at least in part on a domain associated with the depicted item. Domains are described above, for example, with respect to block 410. Weighting the data based at least in part on the domain associated with the depicted item may include determining weighting values to apply to the results from the remote systems. For example, if the determined domain is "food" and the first remote system provides an identification indication of "apple" while the second remote system provides an identification indication of "baseball," a determination may be made that the object-level identification of "apple" is associated with a class or subclass of "food" while the object-level identification of "baseball" has no associated class or subclass of "food." Based on this determination and the determined domain of "food," the results from the first remote system, which identified the item as "apple," may be weighted more heavily than the results of the second remote system.

The biases may additionally, or alternatively, be based at least in part on a time parameter associated with the image data. For example, multiple images depicting an item may be captured over time. The image data corresponding to the multiple images may be sent to the remote systems and multiple identification indications may be received from the remote systems. In some examples, the identification indications from one of the remote systems may be relatively consistent, indicating the identity of the item to be the same or similar items over time, while the identification indications from another of the remote systems may be relatively inconsistent, indicating different identities over time and/or indicating the identity of the item with fluctuating confidences. In these examples, the results from the remote system with more consistent results over time may be weighted more heavily than the results from the remote system with less consistent results over time. It should be understood that the timing described herein may be a matter of seconds, fractions of seconds, minutes, hours, and so forth.

The biases may additionally, or alternatively, be based at least in part on user profile and/or user account data. The user profile and/or user account data may include information related to one or more user profiles and/or accounts. This information may include indications of items and activities that are associated with the profiles and/or accounts. For example, the user profiles and/or accounts may include information indicating that a user associated with the profile and/or account owns a dog, plays baseball, eats fruits frequently, is lactose intolerant, etc. This information can be utilized to weight results received from the remote systems. For example, a first remote system may return results indicating the identity of a depicted item to be "dog" while a second remote system may return results indicating the identity of the detected item to be "cat." The user profile and/or user account data may be accessed and utilized to determine which result to weight more heavily. Sticking with this example, a user associated with the device capturing the image may have a corresponding user profile that indicates that the user owns a dog and does not own a cat. Based at least in part on this information, a bias may be set to weight the results from the first remote system, which identified the item as "dog," more heavily than the results from the second remote system.

Figure 5:
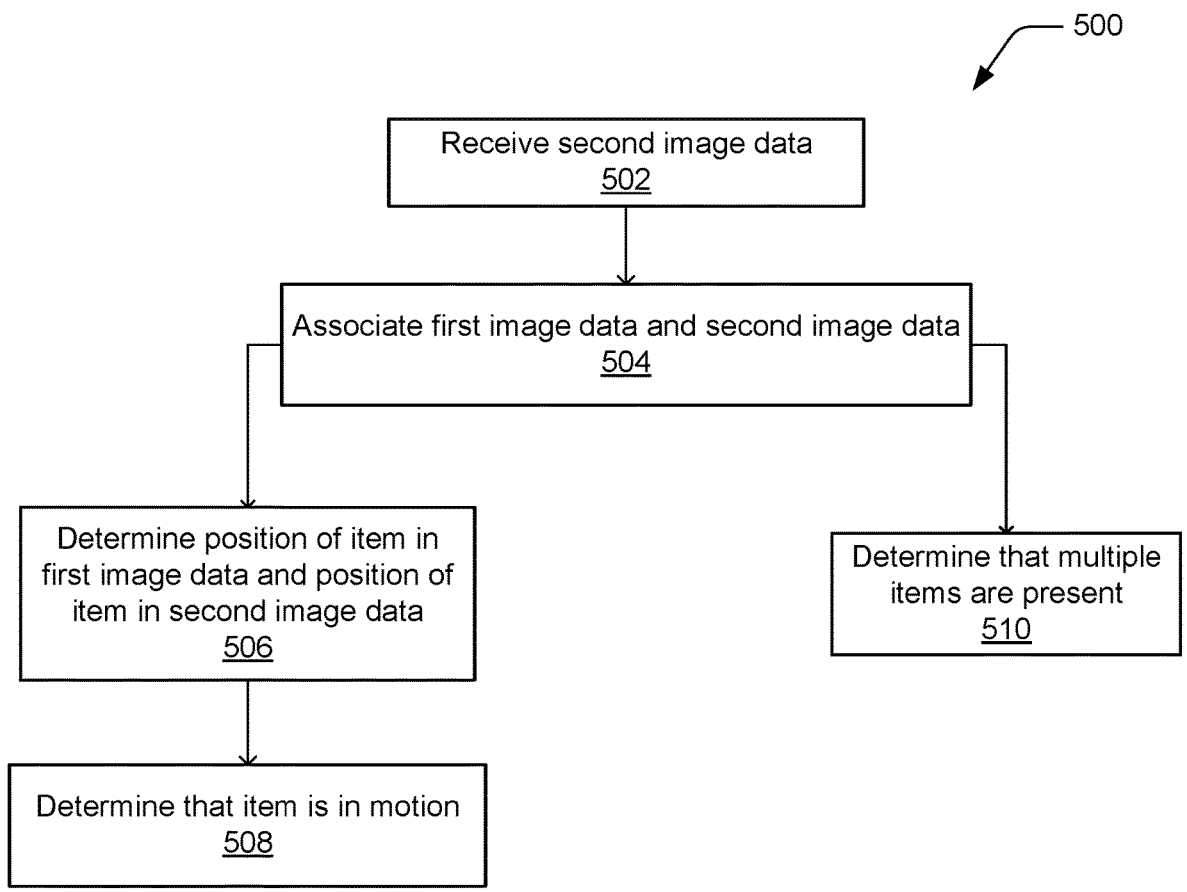
FIG. 5 illustrates a flow diagram of a process 500 for utilizing determination of an event to influence item identification.
Figure 6:
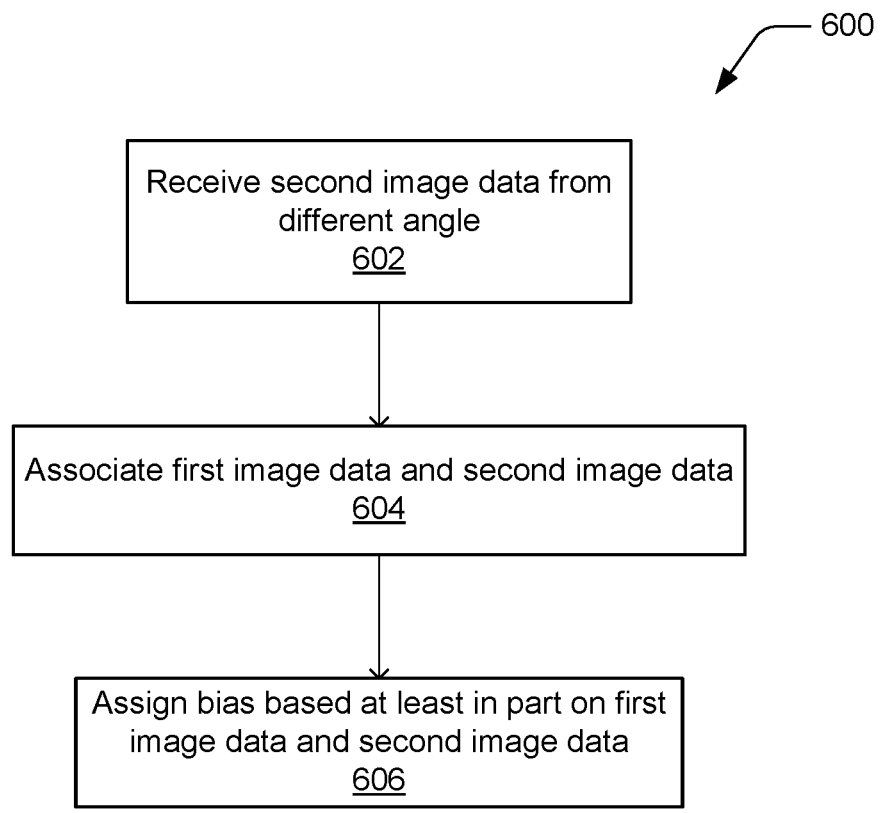
FIG. 6 illustrates a flow diagram of a process 600 for utilizing differing camera angles to influence item identification.

The biases may additionally, or alternatively, be based at least in part on an angle parameter associated with the image data, as described more fully with respect to FIG. 6, and/or on the determination that an event has occurred, as described more fully with respect to FIG. 5.

If, at block 420, at least one bias is determined, then at block 422, the bias is associated with the corresponding remote system and/or the result data from the corresponding remote system. Associating the bias may include weighting the result data, as described above with respect to block 420. If, at block 420, at least one bias is not determined, then the process 400 continues to block 424.

At block 424, the result data from the remote systems may be aggregated. Aggregation of the result data may include associating the received identification indications, confidence scores associated with the indications, and/or biases associated with the remote systems and/or the result data. The following is an example of result aggregation. It should be understood that the method of aggregation and the biases applied to the result data from this example are for illustration purposes only and are not limitations. Take, for example, four images depicting an apple, with two images captured by a first camera and two images captured by a second camera situated at a different angle than the first camera with respect to the apple. The two images taken by each camera are taken at different times from each other. The image data corresponding to these four images is sent, sequentially, or in parallel, to three remote systems for image-based item identification without an indication as to the domain and without formatting.

For the images captured by the first camera, the results from the first remote system provide an identification indication of "apple" at a 90% confidence, the results from the second remote system provide an identification indication of "cherry" at 97% confidence, and the results from the third remote system provide an identification indication of "baseball" at 95% confidence. For the images captured by the second camera, which is situated at a different angle, the results from the first remote system are "fruit" at 56% confidence, the results from the second remote system are "cherry" at 60% confidence, and the results from the third remote system are "ball" at 45% confidence.

One or more biases may be associated with this result data as described above. For example, given that the confidence scores associated with the images captured by the second camera are markedly below the confidence scores associated with the images captured by the first camera, the results associated with the images captured by the second camera may be weighted less than the results associated with the images captured by the first camera. Additionally, given that two of the remote systems identified the item as a type of fruit, the results of the first two remote systems may be weighted more heavily than the third remote system. Additionally, the results of the second remote system may be weighted more heavily than the first remote system based at least in part on the confidence score associated with the results of the second remote system being greater than the confidence score associated with the results of the first remote system. However, the results of the first remote system may be weighted more heavily than the second remote system based at least in part on a weighting value assigned to the first remote system indicating that it provides more accurate results historically and/or it provides more accurate results for items in the "food" domain. Based at least in part on these and/or other biases, at block 426, a selection of the primary identity of the item may be made. Here, given the biases described above, the selection may be that the identity of the item is an "apple."

FIG. 5 illustrates a flow diagram of a process 500 for utilizing determination of an event to influence item identification. The order in which the operations or steps are described is not intended to be construed as a limitation, and any number of the described operations may be combined in any order and/or in parallel to implement process 500. The operations described with respect to FIG. 5 may be supplemental to the operations described with respect to FIG. 4. For example, process 500 may be utilized when multiple images are captured at different times. In addition to the item identification performed by the remote systems with respect to process 400, utilizing information related to multiple images may assist in more accurately determining the identity of an item.

At block 502, second image data corresponding to a second image taken at a time subsequent to the image captured with respect to block 402 may be received. The second image may depict the same item that was depicted in the first image. The second image data may be received via the networks and network interfaces as described herein. At block 504, the first image data received at block 402 from FIG. 4 may be associated with the second image data received at block 502. Association of the first and second image data may be, for example, by determining that the first and second image data are received from the same device, environment, angle, user profile, and/or user account. Once associated, the first and second image data may be analyzed to assist in identification of the item depicted in the first and second images.

At block 506, a determination may be made as to the position of the item in the first image data relative to the environment or other objects in the environment. A determination may also be made as to the position of the item in the second image data relative to the environment or other objects in the environment. In examples, the position of the item may not change as between the first and second image data. In these examples, a determination may be made that the item is stationary and/or inanimate. In other examples, the position of the item may change as between the first and second image data. In these examples, at block 508, a determination may be made that the item is in motion. This determination may indicate that the item is alive or animate. This information may be utilized to bias the results received from the remote system.

By way of example, a determination that the position of an item within the environment has changed may inform the determination of the domain associated with the item. For example, a determination that the position of the item has changed may indicate that the item is alive or otherwise capable of moving. These characteristics of the item may be utilized to determine which results from the remote systems are most relevant. For example, if it is determined that the item is moving, the results from the first remote system include "dog," and the results from the second remote system include "toy," a bias may be set to weight the results from the first remote system more heavily than the results from the second remote system because "dog" may be associated with the characteristic of "alive" or "animate" while "toy" may not be associated with characteristics indicative of motion.

Additionally, or alternatively, at block 510, a determination may be made that the second image data corresponding to an image with multiple items or that the item has been removed from the view of the camera capturing the images. In examples where the event includes the introduction of a new item to the environment, the image data corresponding to images depicting both items may be processed by the remote systems. In these examples, the remote systems may process the image data and provide identification indications that include the identities of both items. Some remote systems may provide multiple item identifications more accurately than other remote systems, which may be utilized to weight the more accurate remote systems more heavily than the less accurate remote systems. Additionally, or alternatively, the addition of a new item may inform the determination of the domain associated with the items. For example, if two items are identified as fruits, the determination that the domain is associated with "food" may be made at a higher confidence than when only one fruit is detected.

In addition to, or alternatively, the second image data may be utilized to more accurately determine certain characteristics of an item depicted in an image. For example, if an item is depicted in the first image and the second image, but a characteristic of the object changes over time, the characteristic change may provide insight into the identity of the object. Using an image depicted a banana as an example, analysis of the first image data may result in identification of the item as a banana. The second image data may correspond to a second image taken at some time after the first image, say, for example, one week after the first image. Analysis of the second image data may indicate that a characteristic of the banana, such as its color, has changes from mostly yellow to a shade of brown. This information may be utilized to determine that the banana is a real banana, as opposed to a plastic or decorative banana. Other examples may include analysis of image data over time corresponding to sugar, salt, flour, etc. These items have a similar appearance, but when handled, move in different ways. Analysis of image data corresponding to images taken of items such as these over time may reveal characteristic movements, which may be utilized to identify the item. By way of example, sugar, when poured, may have a more fluid movement than flour.

FIG. 6 illustrates a flow diagram of a process 600 for utilizing differing camera angles to influence item identification. The order in which the operations or steps are described is not intended to be construed as a limitation, and any number of the described operations may be combined in any order and/or in parallel to implement process 600. The operations described with respect to FIG. 6 may be supplemental to the operations described with respect to FIG. 4 and/or FIG. 5. For example, process 600 may be utilized when images are captured at different angles. In addition to the item identification performed by the remote systems with respect to process 400, utilizing information related to multiple angles may assist in more accurately determining the identity of an item.

At block 602, second image data may be received. The second image data may correspond to an image captured from a different angle from the first image described with respect to block 402 from FIG. 4. At block 604, the first image data received at block 402 from FIG. 4 may be associated with the second image data received at block 602. Association of the first and second image data may be, for example, by determining that the first and second image data are received from the same device, environment, time, user profile, and/or user account. Once associated, the first and second image data may be analyzed to assist in identification of the item depicted in the first and second images.

At block 606, one or more biases may be assigned to the remote systems and/or the results from the remote systems based at least in part analysis of the images from the differing angles. For example, images may be captured from different angles relative to the depicted item. The images may be captured from different angles using the same camera that moves proximate to the item and/or by multiple cameras, which may be moving or stationary, disposed proximate to the item. The image data corresponding to the multiple angles may be sent to the remote systems and multiple identification indications may be received from the remote systems. In some examples, identification indications related to images captured from one angle may be relatively consistent, indicating the identity of the item to be the same or similar items, while the identification indications related to images captured from another angle may be relatively inconsistent, indicating different identities and/or indicating the identity of the item with fluctuating confidences. In these examples, the results associated with images captured from the angle with consistent results may be weighted more heavily than the results associated with images captured from the angle with less consistent results.

In addition to, or alternatively, image data corresponding to images captured at different angles may be utilized to determine the volume of an item. For example, the multiple images captured at different angles may allow for the generation of a full or partial three-dimensional model of the object to be generated. The model may indicate a size of the object, which may include a height, width, and depth of the object and/or components of the object. This size information may be utilized to determine a volume or approximate volume of the object. This information may be utilized to more accurately determine the identity of the object. By way of example, the results received from the remote systems may indicate that the item could be a cherry or an apple. Utilizing the size information from the volume determination, it may be determined that the volume of the object is more similar to the volume of a typical cherry than the volume of a typical apple. This information may be utilized to bias the results to more heavily favor identifying the item as a cherry.

Figure 7:
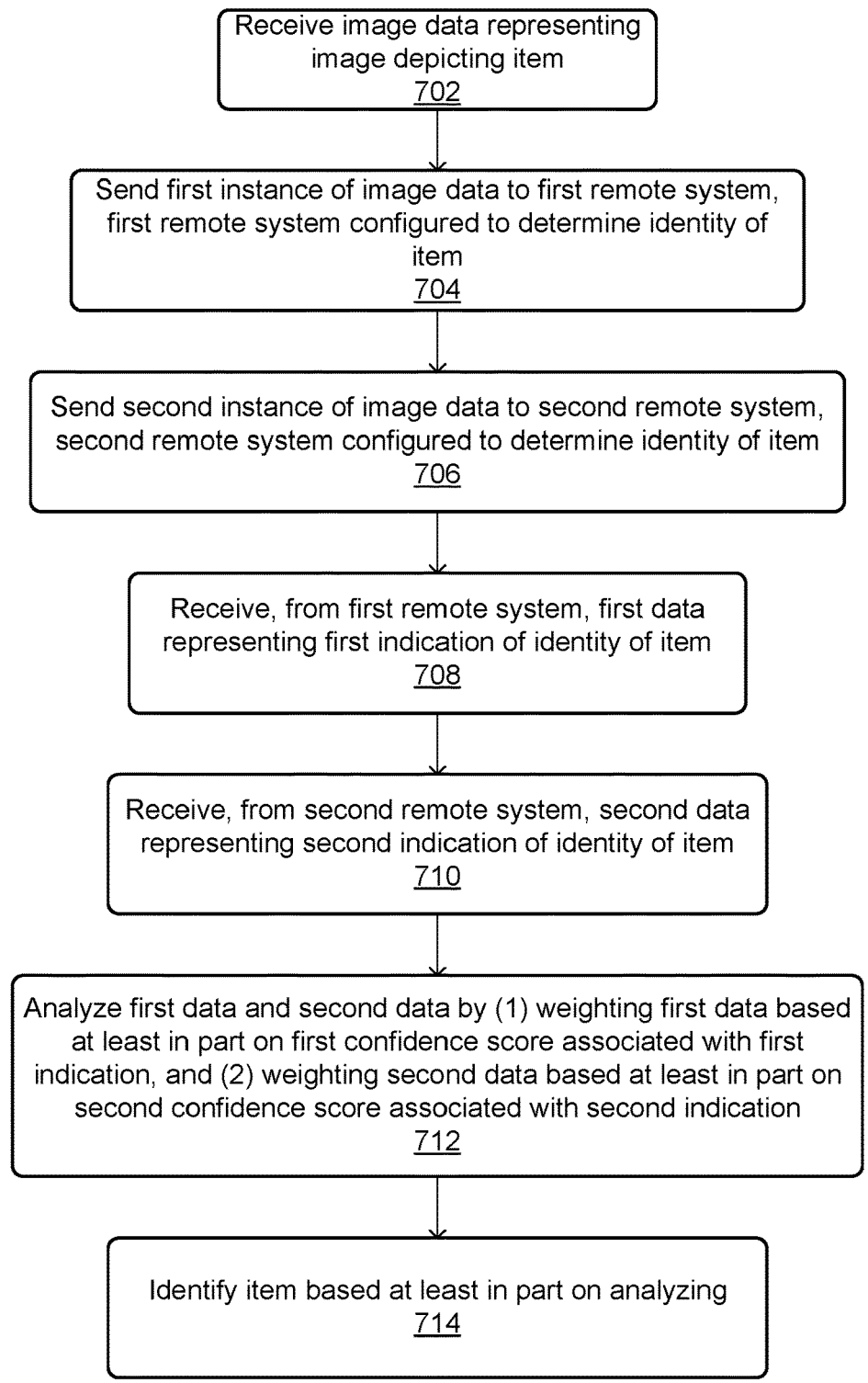
FIG. 7 illustrates a flow diagram of a process for image-based item identification.

FIG. 7 illustrates a flow diagram of a process 700 for image-based item identification. The order in which the operations or steps are described is not intended to be construed as a limitation, and any number of the described operations may be combined in any order and/or in parallel to implement process 700.

At block 702, process 700 may include receiving image data representing an image depicting an item. The image data may be from an application-specific device and/or any device that includes and/or is associated with at least one camera that captures images and generates corresponding image data. The image data may be received over the networks and via the network interfaces described herein.

At block 704, the process 700 may include sending a first instance of the image data to a first remote system, the first remote system configured to determine an identity of the item. As used herein, the term "remote systems" may be used to describe network-based computing systems that are not physical components of the system that receives the image data from the one or more cameras, and/or "remote systems" may be used to describe network-based computing systems that are operated, owned by, controlled by, and/or development by a different person or entity than the device receiving the image data from the one or more cameras.

The image data may be sent to the remote systems in the same or a different format from how the image data was received. For example, a first remote system may accept image data in a range of formats and as such may not require a specific format to process the image data. In other examples, a second remote system may only accept and/or process image data that meets prescribed formatting requirements. The formatting requirements may include, for example, requiring monochromatic images, image size constraints, and/or image file type constraints. In instances where formatting of the image data is required by one or more of the remote systems and/or when formatting of the image data is preferable, the image data may be formatted to comply with the requirements of the remote systems. The formatting may include, for example, resizing the image, converting the image data to a prescribed file type, and/or converting the image data to monochrome.

The image data may also be sent to the remote systems with or without parameters associated with image processing. For example, one or more of the remote systems may require that one or more parameters indicating how image processing is to occur be sent along with the image data. Additionally, the sending of one or more parameters indicating how image processing is to occur may provide the remote systems with instructions, also described herein as a hint, as to how to process the image data. In these examples, one or more parameters may be generated to aid the remote systems in the image-based item identification. For example, one or more parameters may be generated and sent indicating that the accompanying image data should be processed to indicate identification of item(s) depicted in the corresponding image(s). Additionally, or alternatively, one or more parameters may be generated and sent indicating a domain, or category of items, from which to identify the item(s), and/or an environment from which the image(s) were captured, and/or times at which the image(s) were captured, and/or angles at which the image(s) were captured, and/or event(s) that may have occurred with respect to the item(s). These parameters may be generated and sent in association with the image data to provide one more of the remote systems with a hint as to what item(s) are depicted in the captured images.

The image data may be sent to the remote systems via one or more application programming interfaces (APIs). The APIs may be provided by the remote systems as a means for accessing the functionality of the remote systems. For example, the APIs may be web-based APIs and may allow a developer associated with the system to utilize the resources of the remote systems through one or more subroutines, protocols, and tools, for example.

At block 706, the process 700 may include sending a second instance of the image data to a second remote system, the second remote system may be configured to determine the identity of the item. The second instance of the image data may be sent in the same or a similar fashion as the first instance of the image data, as described with respect to block 704, above.

At block 708, the process 700 may include receiving, from the first remote system, first data representing a first indication of the identity of the item. For example, the received data may include one or more words or phrases indicating the detected identity of an item depicted in the image(s). It should be understood that the phrase "identification indication," as used herein, is one of many phrases that could be used to describe the results provided by the remote systems. For example, the results received by the remote systems may not be described as indications, but instead may be probable identifications, identification guesses, identification indications, and so forth. Additionally, while the identification indications are described herein as word and/or phrases, the data received from the remote systems may not specifically include a word or phrases, but instead may include data that, when interpreted, may indicate identification indications as words or phrases.

The received data may additionally include an indication of the confidence level associated with the detected identity.

Staying with the example above of an image depicting an apple, the indicated identity of the item may include words or phrases such as "apple," "food," "red," "fruit," "red apple," "Red Delicious apple," "juicy," "healthy," and/or "nutritious," for example. The confidence level may include, for example, a confidence percentage where 100% corresponds to the highest confidence while 0% corresponds to the lowest confidence. The confidence level may additionally, or alternatively, include different quantitative scales, such as 1-10 or 0-1, and/or qualitative scales such as red-yellow-green with red corresponding to low confidence, yellow corresponding to mid-level confidence, and green corresponding to high confidence. The confidence levels used herein are for illustration purposes only and it should be understood that the confidence level scales may be any quantitative and/or qualitative scale. Additionally, the confidence levels received from the remote systems may differ amongst remote systems. In these examples, normalization or conversion of one or more of the received confidence levels may be performed such that the confidence levels may be more easily compared and utilized.

At block 710, the process 700 may include receiving, from the second remote system, second data representing a second indication of the identity of the item. The second data may be received from the second remote system in the same or a similar fashion as the first data as described with respect to block 708, above.

At block 712, the process 700 may include analyzing the first data and the second data. The analysis may include weighting the first data based at least in part on a first confidence score associated with the first indication. The analysis may also include weighting the second data based at least in part on a second confidence score associated with the second indication.

Weighting the data may be based on one or more factors other than, or in addition to, the confidence scores. For example, weighting the data may be based at least in part on biases associated with the remote systems. By way of example, a first weighting value may be applied to results from the first remote system and/or a second weighting value may be applied to results from the second remote system. The weighting values may be based at least in part on previous identification of items by the remote systems.

By way of example, previous identification of items may indicate that the first remote system provides more accurate identification indications than the second remote system, and/or the first remote system provides identification indications with higher confidence scores than the second remote system. These weighting values may be utilized to weight the results from the first and second remote systems such that, in this example, the results from the first remote system are given more value or weighted more heavily that the results from the second remote system. The weighting values described herein may be, for example, coefficients associated with a confidence that the identity of a depicted item matches the identification indication provided by the remote systems. The weighting values described herein may be initially set to a default or core bias and may be adjusted and/or updated based at least in part on the accuracy of identification indications over time.

Weighting the data may additionally, or alternatively, be based at least in part on a domain associated with the depicted item and/or the device used to capture the image(s) depicting the item. The domain may correspond to a category of items to which the depicted item belongs. Domains may correlate to class-level and/or subclass-level identifiers from one or more ontologies. For example, if the depicted item is an "apple," a domain of "food" may be associated with the "apple." The domain associated with a depicted item may be based at least in part on the device from which the image data was received. For example, the device may be an application-specific device that is associated with capturing images related to a particular category of items. For example, an application-specific device of a cutting board or kitchen appliance may be associated with capturing images related to food. Determining that the device is an application-specific device may be based at least in part on an indication provided by the device and/or an analysis of previous results that indicate the most frequently-identified items are associated with a given domain. Additionally, or alternatively, the domain may be determined based at least in part on identification of the environment in which the device capturing the images is disposed. For example, when the device is disposed in a kitchen, the domain may be determined to be "food," while a device disposed at a baseball stadium may be associated with the domain of "sports." Determining that the device is disposed in a given environment may be based at least in part on an indication provided by the device and/or an analysis of previous results that indicate the environment. The domain may additionally, or alternatively, be determined based on a first set of results from the remote systems and then the determined domain may be utilized to weight the results and/or to provide a domain parameter to the remote systems. For example, in instances where the domain is not known, first image data may be sent to one or more of the remote systems and results may be received. The results may indicate that the item is associated with a particular domain. That information may be utilized to generate a domain parameter to be sent with the first image data, or second image data generated subsequent to determining the domain, to one or more of the remote systems to aid in the identification of the item. Additionally, or alternatively, the determined domain may be utilized to weight the results from the remote systems such that results associated with the determined domain are weighted more heavily than the results not associated with the determined domain.

Weighting the data based at least in part on the domain associated with the depicted item may include determining weighting values to apply to the results from the remote systems. For example, if the determined domain is "food" and the first remote system provides an identification indication of "apple" while the second remote system provides an identification indication of "baseball," it may be determined that the object-level identification of "apple" is associated with a class or subclass of "food" while the object-level identification of "baseball" has no associated class or subclass of "food." Based on this determination and the determined domain of "food," the results from the first remote system, which identified the item as "apple," may be weighted more heavily than the results of the second remote system. Additionally, or alternatively, a core bias or learned bias of the first remote system may be that it historically or categorically provides accurate results when identifying items in the "food" domain, while the second remote system is not associated with such a bias or is associated with a bias that indicates the second remote system historically or categorically does not provide accurate results when identifying items in the food domain. Based on these biases, the results from the remote systems may be weighted accordingly.

Weighting the data may additionally, or alternatively, be based at least in part on a time parameter associated with the image data. For example, multiple images depicting an item may be captured over time. The image data corresponding to the multiple images may be sent to the remote systems and multiple identification indications may be received from the remote systems. In some examples, the identification indications from one of the remote systems may be relatively consistent, indicating the identity of the item to be the same or similar over time, while the identification indications from another of the remote systems may be relatively and/or comparatively inconsistent, indicating different identities over time and/or indicating the identity of the item with fluctuating confidences. In these examples, the results from the first remote system with more consistent results over time may be weighted more heavily than the results from the second remote system with less consistent results over time. It should be understood that the timing described herein may be a matter of seconds, fractions of seconds, minutes, hours, and so forth.

Weighting the data may additionally, or alternatively, be based at least in part on an angle parameter associated with the image data. For example, images may be captured from different angles relative to the depicted item. The images may be captured from different angles using the same camera that moves proximate to the item and/or by multiple cameras, which may be moving or stationary, disposed proximate to the item. The image data corresponding to the multiple angles may be sent to the remote systems and multiple identification indications may be received from the remote systems. In some examples, identification indications related to images captured from one angle may be relatively consistent, indicating the identity of the item to be the same or similar items and/or indicating the identity of the item with consistently high confidence scores, while the identification indications related to images captured from another angle may be relatively inconsistent, indicating different identities and/or indicating the identity of the item with fluctuating confidences. In these examples, the results associated with images captured from the angle with consistent results may be weighted more heavily than the results associated with images captured from the angle with less consistent results.

Weighting the data may additionally, or alternatively, be based at least in part on determining that an event has occurred with respect to the environment in which the item is disposed. By way of example, the event may be the introduction or removal of an item from the view of one or more cameras capturing images of the environment. In other examples, the event may be the change of position of an item within the environment. In examples where the event includes the introduction of a new item to the environment, the image data corresponding to images depicting both items may be processed by the remote systems. In these examples, the remote systems may process the image data and provide identification indications that include the identities of both items. Some remote systems may provide multiple item identifications more accurately than other remote systems, which may be utilized to weight the more accurate remote systems more heavily than the less accurate remote systems.

Additionally, or alternatively, the addition of a new item may inform the determination of the domain associated with the items. For example, if two items are identified as fruits, the determination that the domain is associated with "food" may be made at a higher confidence than when only one fruit is detected. Additionally, or alternatively, a determination that the position of an item within the environment has changed may inform the determination of the domain associated with the item. For example, a determination that the position of the item has changed may indicate that the item is alive or otherwise capable of moving. These characteristics of the item may be utilized to determine which results from the remote systems are most relevant. For example, if it is determined that the item is moving, the results from the first remote system include "dog," and the results from the second remote system include "toy," the results from the first remote system may be weighted more heavily than the results from the second remote system because "dog" may be associated with the characteristic of "alive" or "animate" while "toy" may not be associated with characteristics indicative of motion.

Weighting the data may additionally, or alternatively, be based at least in part on data stored in a user profile and/or user account database. The user profile and/or user account database may include information related to one or more user profiles and/or accounts. This information may include indications of items and activities that are associated with the profiles and/or accounts. For example, the user profiles and/or accounts may include information indicating that a user associated with the profile and/or account owns a dog, plays baseball, eats fruits frequently, is lactose intolerant, etc. This information can be utilized to weight results received from the remote systems. For example, the first remote system may return results indicating the identity of a depicted item to be "dog" while the second remote system may return results indicating the identity of the detected item to be "cat." User profile and/or account information may be utilized to determine which result to weight more heavily. Sticking with this example, a user associated with the device capturing the image may have a corresponding user profile that indicates that the user owns a dog and/or does not own a cat. Based at least in part on this information, the results from the first remote system, which identified the item as "dog," may be weighted more heavily than the results from the second remote system.

At block 714, the process 700 may include identifying the item based at least in part on the analysis performed at block 712. One or more of the weighting values described herein may be utilized to bias or weight the results obtained from the remote systems. In doing so, results that are more likely to include an accurate identification indication of an item depicted in image(s) are favored over results that are less likely to include accurate identification indications.

Figure 8:
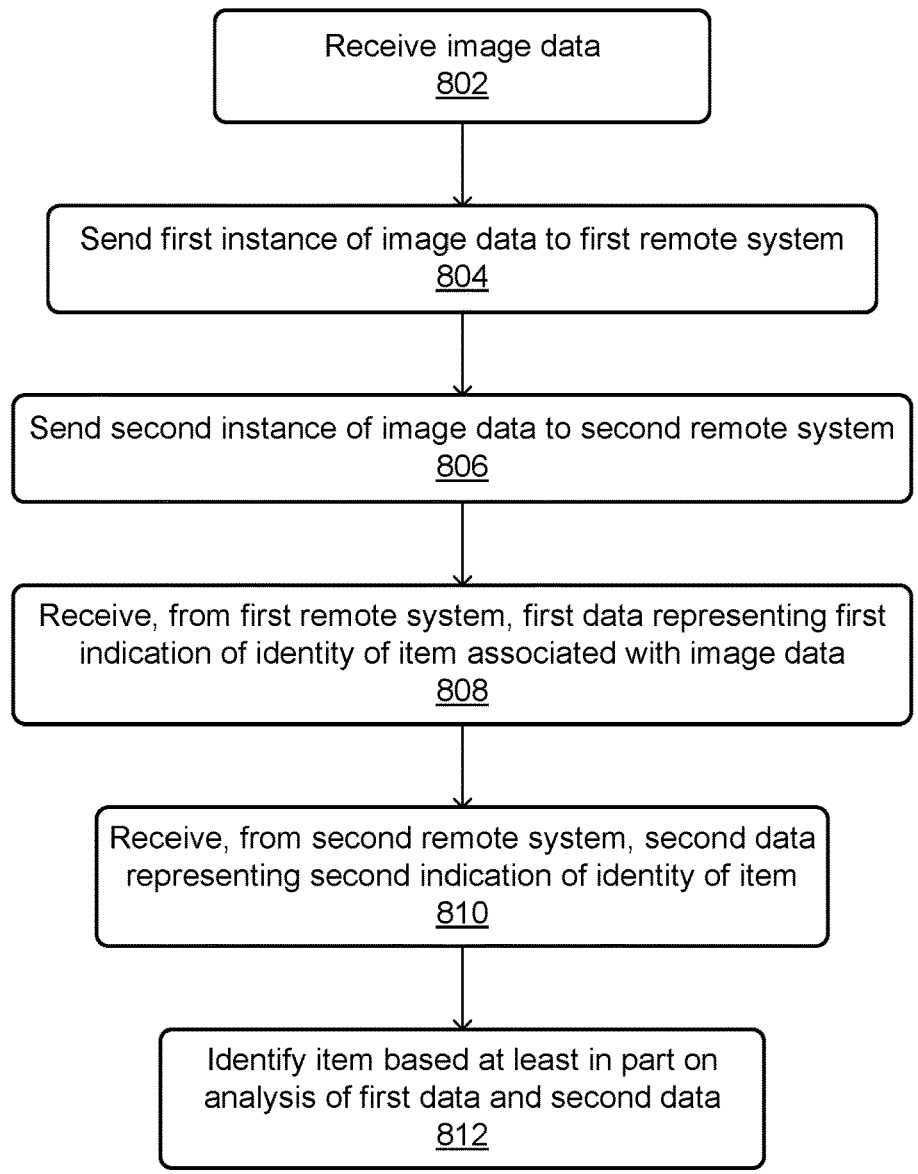
FIG. 8 illustrates a flow diagram of another process for image-based item identification.

FIG. 8 illustrates a flow diagram of a process 800 for image-based item identification. The order in which the operations or steps are described is not intended to be construed as a limitation, and any number of the described operations may be combined in any order and/or in parallel to implement process 800.

At block 802, the process 800 may include receiving image data. The image data may be from an application-specific device and/or any device that includes and/or is associated with at least one camera that captures images and generates corresponding image data. The image data may be received over the networks and via the network interfaces described herein.

At block 804, the process 800 may include sending a first instance of the image data to a first remote system. The image data may be sent to the remote systems in the same or a different format from how the image data was received. The image data may also be sent to the remote systems with or without parameters associated with image processing. The image data may be sent to the remote systems via one or more application programming interfaces (APIs). The APIs may be provided by the remote systems as a means for accessing the functionality of the remote systems. For example, the APIs may be web-based APIs and may allow a developer associated with the system to utilize the resources of the remote systems through one or more subroutines, protocols, and tools, for example. The image data may be sent in the same or a similar fashion as the image data sent with respect to block 704 described above.

At block 806, the process 800 may include sending a second instance of the image data to a second remote system. The second instance of the image data may be sent in the same or a similar fashion as the first instance of the image data, as described with respect to block 804, above.

At block 808, the process 800 may include receiving, from the first remote system, first data representing a first indication of an identity of an item associated with the image data. For example, the received data may include one or more words or phrases indicating the detected identity of an item depicted in the image(s). It should be understood that the phrase "identification indication," as used herein, is one of many phrases that could be used to describe the results provided by the remote systems. For example, the results received by the remote systems may not be described as indications, but instead may be probable identifications, identification guesses, identification indications, and so forth. Additionally, while the identification indications are described herein as word and/or phrases, the data received from the remote systems may not specifically include a word or phrases, but instead may include data that, when interpreted, may indicate identification indications as words or phrases.

The received data may additionally include an indication of the confidence level associated with the detected identity. The confidence level may include, for example, a confidence percentage where 100% corresponds to the highest confidence while 0% corresponds to the lowest confidence. The confidence level may additionally, or alternatively, include different quantitative scales, such as 1-10 or 0-1, and/or qualitative scales such as red-yellow-green with red corresponding to low confidence, yellow corresponding to mid-level confidence, and green corresponding to high confidence. The confidence levels used herein are for illustration purposes only and it should be understood that the confidence level scales may be any quantitative and/or qualitative scale. Additionally, the confidence levels received from the remote systems may differ amongst remote systems. In these examples, normalization or conversion of one or more of the received confidence levels may be performed such that the confidence levels may be more easily compared and utilized.

At block 810, the process 800 may include receiving, from the second remote system, second data representing a second indication of the identity of the item. The second data may be received from the second remote system in the same or a similar fashion as the first data as described with respect to block 808, above.

At block 812, the process 800 may include identifying the item based at least in part on an analysis of the first data and the second data. The analysis may include weighting the first data based at least in part on a first confidence score associated with the first indication. The analysis may also include weighting the second data based at least in part on a second confidence score associated with the second indication. Weighting the data may be based on one or more values other than, or in addition to, the confidence scores. For example, weighting the data may be based at least in part on biases associated with the remote systems. Weighting the data may additionally, or alternatively, be based at least in part on a domain associated with the depicted item and/or the device used to capture the image(s) depicting the item. Weighting the data based at least in part on the domain associated with the depicted item may include determining weighting values to apply to the results from the remote systems. Weighting the data may additionally, or alternatively, be based at least in part on a time parameter associated with the image data. Weighting the data may additionally, or alternatively, be based at least in part on an angle parameter associated with the image data. Weighting the data may additionally, or alternatively, be based at least in part on determining that an event has occurred with respect to the environment in which the item is disposed. Weighting the data may additionally, or alternatively, be based at least in part on data stored in a user profile and/or user account database.

One or more of the weighting values described herein may be utilized to bias or weight the results obtained from the remote systems. In doing so, results that are more likely to include an accurate identification indication of an item depicted in image(s) are favored over results that are less likely to include accurate identification indications.

Figure 9:
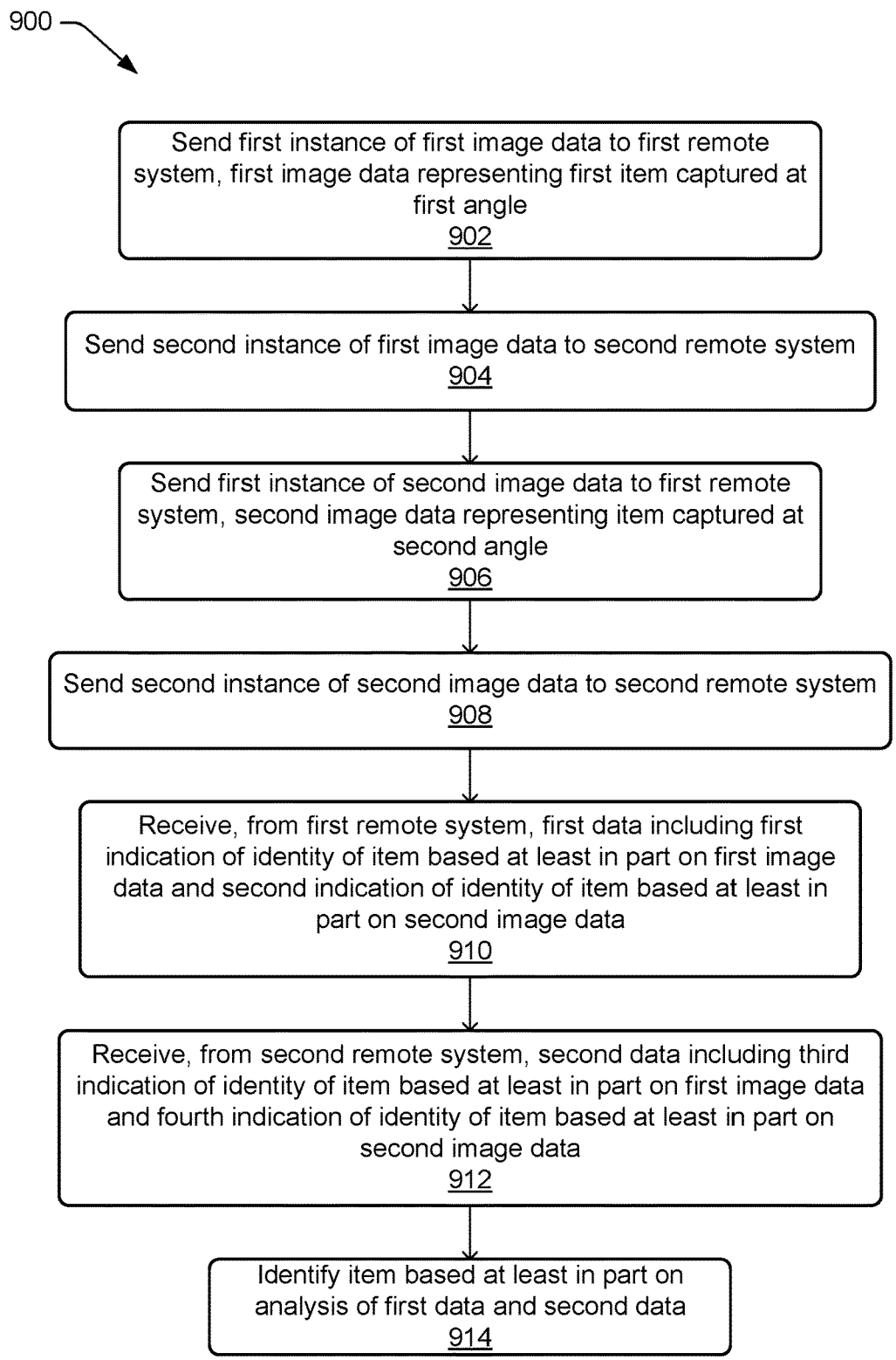
FIG. 9 illustrates a flow diagram of another process for image-based item identification.

FIG. 9 illustrates a flow diagram of a process 900 for image-based item identification. The order in which the operations or steps are described is not intended to be construed as a limitation, and any number of the described operations may be combined in any order and/or in parallel to implement process 900.

At block 902, the process 900 may include sending a first instance of first image data to a first remote system. The first image data may represent an item captured at a first angle. The image data may be sent to the remote systems in the same or a different format from how the image data was received. The image data may also be sent to the remote systems with or without parameters associated with image processing. The image data may be sent to the remote systems via one or more application programming interfaces (APIs). The APIs may be provided by the remote systems as a means for accessing the functionality of the remote systems. For example, the APIs may be web-based APIs and may allow a developer associated with the system to utilize the resources of the remote systems through one or more subroutines, protocols, and tools, for example. The image data may be sent in the same or a similar fashion as the image data sent with respect to block 704 described above.

At block 904, the process 900 may include sending a second instance of the first image data to a second remote system. The second instance of the image data may be sent in the same or a similar fashion as the first instance of the image data, as described with respect to block 902, above.

At block 906, the process 900 may include sending a first instance of second image data to the first remote system. The second image data may represent the item captured at a second angle. The first instance of the second image data may be sent in the same or a similar fashion as the first instance of the first image data, as described with respect to block 904, above.

At block 908, the process may include sending a second instance of the second image data to the second remote system. The second instance of the second image data may be sent in the same or a similar fashion as the first instance of the second image data, as described with respect to block 906, above.

At block 910, the process 900 may include receiving, from the first remote system, first data including a first indication of an identity of the item based at least in part on the first image data and a second indication of the identity of the item based at least in part on the second image data. For example, the received data may include one or more words or phrases indicating the detected identity of an item depicted in the image(s). It should be understood that the phrase "identification indication," as used herein, is one of many phrases that could be used to describe the results provided by the remote systems. For example, the results received by the remote systems may not be described as indications, but instead may be probable identifications, identification guesses, identification indications, and so forth. Additionally, while the identification indications are described herein as word and/or phrases, the data received from the remote systems may not specifically include a word or phrases, but instead may include data that, when interpreted, may indicate identification indications as words or phrases.

The received data may additionally include an indication of the confidence level associated with the detected identity. The confidence level may include, for example, a confidence percentage where 100% corresponds to the highest confidence while 0% corresponds to the lowest confidence. The confidence level may additionally, or alternatively, include different quantitative scales, such as 1-10 or 0-1, and/or qualitative scales such as red-yellow-green with red corresponding to low confidence, yellow corresponding to mid-level confidence, and green corresponding to high confidence. The confidence levels used herein are for illustration purposes only and it should be understood that the confidence level scales may be any quantitative and/or qualitative scale. Additionally, the confidence levels received from the remote systems may differ amongst remote systems. In these examples, normalization or conversion of one or more of the received confidence levels may be performed such that the confidence levels may be more easily compared and utilized.

At block 912, the process 900 may include receiving, from the second remote system, second data including a third indication of the identity of the item based at least in part on the first image data and a fourth indication of the identity of the item based at least in part on the second image data. The second data may be received from the second remote system in the same or a similar fashion as the first data as described with respect to block 910, above.

At block 914, the process 900 may include identifying the item based at least in part on an analysis of the first data and the second data. The analysis may include weighting the first data based at least in part on a first confidence score associated with the first indication. The analysis may also include weighting the second data based at least in part on a second confidence score associated with the second indication. Weighting the data may be based on one or more factors other than, or in addition to, the confidence scores. For example, weighting the data may be based at least in part on an angle parameter associated with the image data. Weighting the data may additionally, or alternatively, be based at least in part on biases associated with the remote systems. Weighting the data may additionally, or alternatively, be based at least in part on a domain associated with the depicted item and/or the device used to capture the image(s) depicting the item. Weighting the data based at least in part on the domain associated with the depicted item may include determining weighting values to apply to the results from the remote systems. Weighting the data may additionally, or alternatively, be based at least in part on a time parameter associated with the image data. Weighting the data may additionally, or alternatively, be based at least in part on determining that an event has occurred with respect to the environment in which the item is disposed. Weighting the data may additionally, or alternatively, be based at least in part on data stored in a user profile and/or user account database.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
   receiving image data;
   sending, prior to identifying an item associated with the image data, the image data to a first image processing system;
   receiving, from the first image processing system associated with a first category of items identified by a first parameter sent by the first image processing system, first data representing a first identity of the item associated with the image data, the first identity associated with a first confidence score;
   sending, prior to identifying the item, the image data to a second image processing system, the second image processing system differing from the first image processing system;
   receiving, from the second image processing system associated with a second category of items identified by a second parameter sent by the second image processing system, second data representing a second identity of the item associated with the image data, the second identity associated with a second confidence score;
   determining that the image data is associated with the first category of items;
   weighting, based at least in part on the image data being associated with the first category of items, the first confidence score such that a weighted confidence score is generated; and
   identifying the item utilizing the first data instead of the second data based at least in part on the weighted confidence score indicating greater confidence than the second confidence score.

2. The method of claim 1, further comprising:
   receiving user input data, in association with receipt of the image data, at an application associated with the first category of items; and
   wherein determining that the image data is associated with the first category of items comprises determining that the image data is associated with the first category of items based at least in part on the user input data.

3. The method of claim 1, further comprising:
   causing display, on a user device from which the image data was received, of the first identity in association with the weighted confidence score; and
   causing display, on the user device, of the second identity in association with the second confidence score, wherein display of the first identity includes an indication that the first identity was selected.

4. The method of claim 1, further comprising:
   identifying an environment of a device from which the image data is received; and
   wherein determining that the image data is associated with the first category of items comprises determining that the image data is associated with the first category of items based at least in part on the environment.

5. The method of claim 1, further comprising:
   receiving an indication that the item is associated with the first category of items; and
   wherein determining that the image data is associated with the first category of items comprises determining that the image data is associated with the first category of items based at least in part on the indication.

6. The method of claim 1, further comprising:
   storing information indicating items associated with a user profile;
   determining that a device from which the image data is received is associated with the user profile;
   determining that the items associated with the user profile are associated with the first category of items; and
   wherein determining that the image data is associated with the first category of items comprises determining that the image data is associated with the first category of items based at least in part on the items being associated with the first category of items.

7. The method of claim 1, further comprising:
   sending, to at least one of the first image processing system or the second image processing system, parameters for performing image analysis.

8. The method of claim 1, further comprising:
   determining that the image data is associated with the second category of items;
   determining a bias associated with a user profile that the image data was sent in association with, the bias favoring the first category of items; and
   wherein identifying the item utilizing the first data instead of the second data comprises identifying the item utilizing the first data instead of the second data based at least in part on the bias.

9. The method of claim 1, further comprising:
   receiving user input data indicating selection of the first category of items and the second category of items from a database; and
   wherein:
     receiving the first data from the first image processing system is based at least in part on the selection of the first category of items from the user input data; and
     receiving the second data from the second image processing system is based at least in part on the selection of the second category of items from the user input data.

10. The method of claim 1, further comprising:
    causing display of the first identity;
    causing display of the second identity; and
    causing display of an indicator that the first identity was selected.

11. A system, comprising:
    one or more processors; and
    non-transitory computer-readable media storing instructions that, when executed by the one or more processors, cause the one or more processors to perform operations comprising:
      receiving image data;
      sending, prior to identifying an item associated with the image data, the image data to a first image processing system;
      receiving, from the first image processing system associated with a first category of items identified by a first parameter sent by the first image processing system, first data representing a first identity of the item associated with the image data, the first identity associated with a first confidence score;

sending, prior to identifying the item, the image data to a second image processing system, the second image processing system differing from the first image processing system;

receiving, from the second image processing system associated with a second category of items identified by a second parameter sent by the second image processing system, second data representing a second identity of the item associated with the image data, the second identity associated with a second confidence score;

determining that the image data is associated with the first category of items;

weighting, based at least in part on the image data being associated with the first category of items, the first confidence score such that a weighted confidence score is generated; and identifying the item utilizing the first data instead of the second data based at least in part on the weighted confidence score indicating greater confidence than the second confidence score.

12. The system of claim 11, the operations further comprising:

receiving user input data, in association with receipt of the image data, at an application associated with the first category of items; and wherein determining that the image data is associated with the first category of items comprises determining that the image data is associated with the first category of items based at least in part on the user input data.

13. The system of claim 11, the operations further comprising:

causing display, on a user device from which the image data was received, of the first identity in association with the weighted confidence score; and causing display, on the user device, of the second identity in association with the second confidence score, wherein display of the first identity includes an indication that the first identity was selected.

14. The system of claim 11, the operations further comprising:

identifying an environment of a device from which the image data is received; and wherein determining that the image data is associated with the first category of items comprises determining that the image data is associated with the first category of items based at least in part on identifying the environment.

15. The system of claim 11, the operations further comprising:

receiving an indication that the item is associated with the first category of items; and wherein determining that the image data is associated with the first category of items comprises determining that the image data is associated with the first category of items based at least in part on the indication.

16. The system of claim 11, the operations further comprising:

storing information indicating items associated with a user profile;

determining that a device from which the image data is received is associated with the user profile;

determining that the items associated with the user profile are associated with the first category of items; and wherein determining that the image data is associated with the first category of items comprises determining that the image data is associated with the first category of items based at least in part on the items being associated with the first category of items.

17. The system of claim 11, the operations further comprising:

sending, to at least one of the first image processing system or the second image processing system, parameters for performing image analysis.

18. The system of claim 11, the operations further comprising:

determining that the image data is associated with the second category of items;

determining a bias associated with a user profile that the image data was sent in association with, the bias favoring the first category of items; and wherein identifying the item utilizing the first data instead of the second data comprises identifying the item utilizing the first data instead of the second data based at least in part on the bias.

19. The system of claim 11, the operations further comprising:

receiving user input data indicating selection of the first category of items and the second category of items from a database; and wherein:

receiving the first data from the first image processing system is based at least in part on the selection of the first category of items from the user input data; and receiving the second data from the second image processing system is based at least in part on the selection of the second category of items from the user input data.

20. The system of claim 11, the operations further comprising:

causing display of the first identity;

causing display of the second identity; and causing display of an indicator that the first identity was selected.

* * * * *